(12) United States Patent
Hoen et al.

(10) Patent No.: US 6,411,589 B1
(45) Date of Patent: Jun. 25, 2002

(54) SYSTEM AND METHOD FOR FORMING ELECTROSTATICALLY ACTUATED DATA STORAGE MECHANISMS

(75) Inventors: Storrs Hoen, Brisbane; Paul P. Merchant, Belmont; Carl P. Taussig, Redwood City, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/126,004

(22) Filed: Jul. 29, 1998

(51) Int. Cl.[7] ................................................ G11B 9/00
(52) U.S. Cl. ....................................... 369/126; 369/101
(58) Field of Search ................................ 369/126, 101; 205/306; 438/455; 257/757; 365/151, 118, 128; 310/309

(56) References Cited

U.S. PATENT DOCUMENTS

| | | | | |
|---|---|---|---|---|
| 5,392,275 A | * | 2/1995 | Kawada et al. | 369/126 |
| 5,557,596 A | * | 9/1996 | Gibson et al. | 369/101 |
| 5,751,683 A | * | 5/1998 | Kley | 369/126 |
| 5,835,477 A | * | 11/1998 | Binnig et al. | 369/126 |
| 5,953,306 A | * | 9/1999 | Yi | 369/126 |
| 6,191,518 B1 | * | 2/2001 | Kenichiro | 310/309 |
| 6,262,962 B1 | * | 7/2001 | Aratani | 369/126 |

* cited by examiner

*Primary Examiner*—William Korzuch
*Assistant Examiner*—Kim-Kwok Chu

(57) ABSTRACT

Data storage media are integrated into a microfabricated data storage system. Each data storage medium is located on one surface of a movable support. Flexures connected to the movable support allow the medium to move within a plane so that data can be stored at different locations on the medium, but significantly resist any out of the plane motion of the medium. Therefore, tips or other devices for writing or reading to or from the medium can be placed a small distance from the medium, thereby facilitating microfabrication of the data storage system. First electrodes are coupled to a second surface of the movable support opposite the medium. Second electrodes are located opposite the first electrodes to form an electrostatic surface actuator. Electric fields generated by the second electrodes interact with an electric field generated by the first electrodes to apply a force to the first electrodes and, hence, the movable support and the medium. After forming the media on a microfabricated wafer, the wafer can be bonded to another microfabricated wafer, and the resulting structure can thereby be sealed by a gasket to seal the media within the data storage system. Preferably the bonding process to join the microfabricated wafers is CMOS (complementary metal-oxide semiconductor) compatible by using elements such as palladium and silicon that bond at relatively low temperatures.

41 Claims, 19 Drawing Sheets

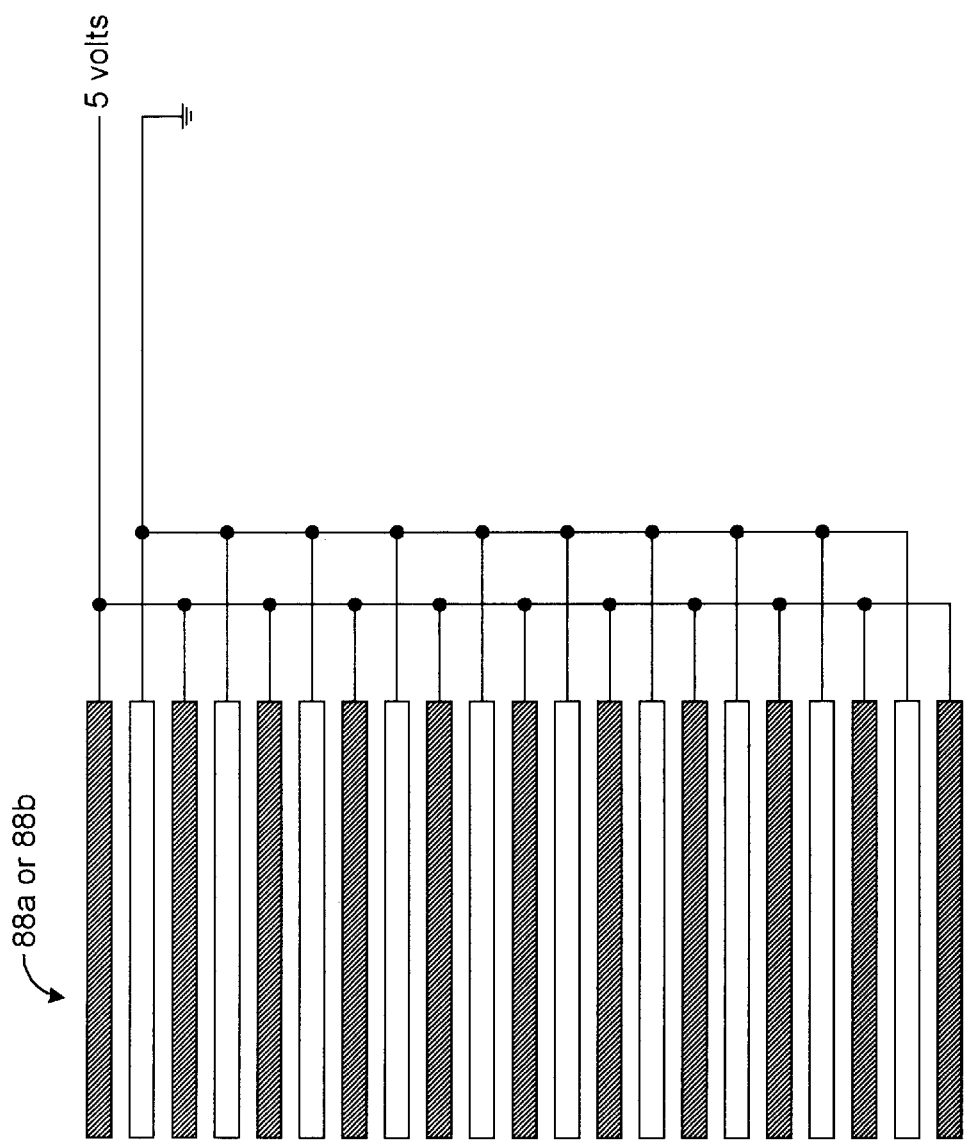

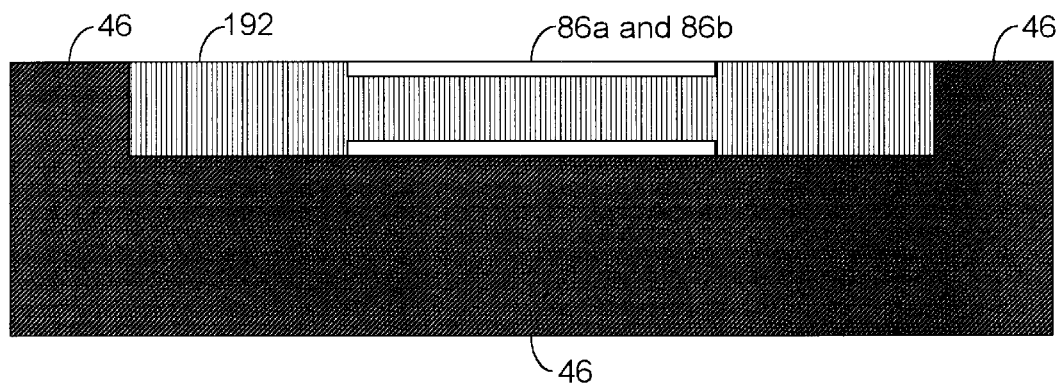
Fig. 5D
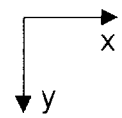
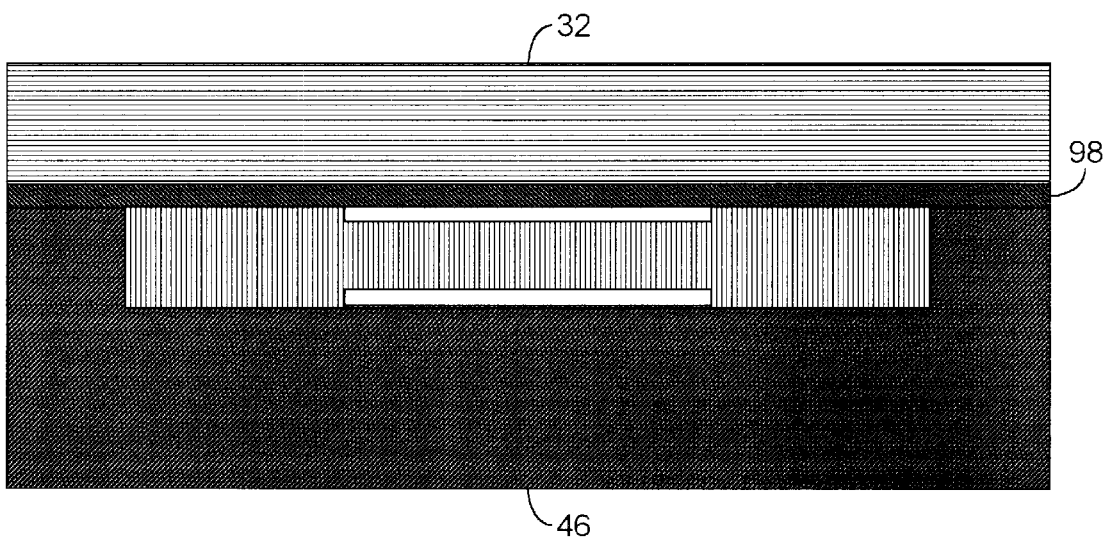
Fig. 5E

SYSTEM AND METHOD FOR FORMING ELECTROSTATICALLY ACTUATED DATA STORAGE MECHANISMS

CROSS REFERENCE TO RELATED APPLICATIONS

This document is related to co-pending U.S. Patent Application entitled SYSTEM AND METHOD FOR BONDING AND SEALING MICROFABRICATED WAFERS TO FORM A SINGLE MONOLITHIC STRUCTURE HAVING A VACUUM CHAMBER THEREIN, assigned Ser. No. 09/124,311, and filed by Merchant et al. on Jul. 29, 1998, and to co-pending U.S. Patent Application entitled SYSTEM AND METHOD FOR BONDING WAFERS, assigned Ser. No. 09/124,099, and filed by Merchant et al. on Jul. 29, 1998, which are both incorporated herein by reference.

BACKGROUND OF THE INVENTION

1. Field of the Invention

The present invention generally relates to microfabrication of data storage mechanisms and, in particular, to a system and method for forming integrated data storage mechanisms that are actuated by electrostatic forces.

2. Related Art

In current computer systems, data is frequently stored and retrieved respectively to and from memory while forming and executing application programs. The memory used to store the information can be any medium having properties that can be altered in order to reflect data patterns. For example, a magnetic type of material is frequently used as the data storage medium, and as known in the art, the polarization of magnetic material can be set by passing magnetic fields through the material. When it is desirable to store data, a device sets the polarization of particular locations on the medium to reflect the data pattern being stored. Later, when it is desirable to retrieve the stored data, the device can return to the particular locations on the data storage medium and analyze the polarization of the magnetic material to determine the data pattern of the data being retrieved. Therefore, the device used to store and retrieve data should be capable of moving to particular locations on the medium with a high level of precision and accuracy.

In tip-based data storage, the data storage medium is formed at a certain distance from one or more tips, which are capable of storing and retrieving data from the medium. The elements forming the tips are usually small conical structures, fabricated by the techniques of micromachining. The medium may be directly in contact with the tips as in the cases of thermomechanical data storage or ferroelectric phase change data storage or may be separated from the tips as in the cases of near-field optical data storage or field-emission data storage. Similar to magnetic data storage, the medium is usually moved relative to the tips in order to access data. The tips can transmit a laser or an electron beam to alter the properties of the medium in order to reflect the bit pattern of the data being stored. Therefore, the material of the medium is not necessarily magnetic and can be any material with properties capable of being altered by transmissions from the tips.

As can be appreciated by one skilled in the art, it is desirable to microfabricate data storage devices in order to reduce the costs of manufacturing and to reduce the size of the data storage devices. Furthermore, microfabrication of data storage devices can be facilitated if electrostatic actuators can be utilized to actuate the data storage devices. In this regard, electrostatic actuators typically utilize electrodes to generate electrical fields that can be used to supply the necessary forces for moving the data storage medium, and these electrodes can be easily formed through microfabrication techniques. Additionally, electrostatic actuators can operate at relatively low power. Therefore, it is often desirable to use electrostatic actuators for actuating microfabricated data storage devices.

However, a problem with most common electrostatic actuators is that relatively high drive voltages (sometimes more than 100 Volts) are required for operation. Moreover, the overall area and, hence, the cost of the storage device are determined primarily by the area required by the electrostatic actuators. In addition, the dissimilar materials in most conventional electrostatic actuators have varying thermal expansion properties. Therefore, the components of the actuators-bend due to temperature changes, and as a result, the components of the data storage device are separated by larger distances (requiring higher voltages for actuation) in order to accommodate for the bending. Consequently, the components of the data storage device require larger areas and higher voltages due to the varying thermal expansion properties of the dissimilar materials within the electrostatic actuators.

Furthermore, many electrostatic actuators do not easily allow motion in a two-dimensional plane, which is desirable for data storage applications. Due to the difficulties of microfabricating suitable electrostatic actuated storage devices, most conventional tip-based storage devices refrain from using electrostatic actuators.

Thus, a previously unaddressed need exists in the industry for a system and method for efficiently forming a tip-based electrostatic storage device capable of production through microfabrication techniques.

SUMMARY OF THE INVENTION

The present invention overcomes the inadequacies and deficiencies of the prior art as discussed above. Briefly described, the present invention provides a system and method for efficiently microfabricating integrated data storage mechanisms that are actuated by electrostatic forces.

In accordance with the present invention, a plurality of data storage media are integrated within a data storage system. Each data storage medium is coupled to a respective movable support that is coupled to a plurality of flexures. The plurality of flexures significantly resists motion of the medium in a first predetermined direction and allows the medium to move in a second predetermined direction. The flexures are preferably comprised of a plurality of interconnected panels that are coupled to the movable support and to a layer of a microfabricated structure in order to support the data storage medium and the movable support.

The movable support coupled to each data storage medium is also coupled to a plurality of electrodes. Preferably, the plurality of electrodes is coupled to a surface of the movable support opposite of the surface of the movable support coupled to the data storage medium. A second plurality of electrodes generates electrical fields that interact with electrical fields generated by the electrodes coupled to the movable support, thereby causing the movable support and, hence, the storage medium to move in a desired direction. Preferably, the second plurality of electrodes are formed substantially parallel to the plurality of electrodes coupled to the moveable support in order to define a surface actuator.

In accordance with another feature of the present invention, one or more tips are formed on another microfabricated structure that is bonded to the microfabricated structure containing the data storage media. Each tip is formed adjacent to a respective data storage medium and is configured to store data on the respective data storage medium. Preferably, the two microfabricated structures are joined via a bond having palladium elements bonded to silicon elements.

In accordance with another feature to the present invention, a gasket is formed between the two microfabricated structures in order to seal the data storage media within the data storage system. The gasket is preferably fused to one of the wafers during the bonding of the two microfabricated structures.

The present invention can also be viewed as providing a method for microfabricating a data storage system. Briefly described, the method can be broadly conceptualized by the following steps: forming a first plurality of electrodes on a surface of a wafer; forming a sacrificial layer on the first plurality of electrodes; forming a second plurality of electrodes on the sacrificial layer; forming a support layer on the sacrificial layer; forming a data storage medium on the support layer; removing portions of the support layer to form flexures that allow the data storage medium to move in a predetermined direction; and removing material from the sacrificial layer.

The present invention has many advantages, a few of which are delineated below, as mere examples.

An advantage of the present invention is that an electrostatically actuated data storage system can be efficiently microfabricated.

Another advantage of the present invention is that production costs of data storage systems can be significantly reduced.

Another advantage of the present invention is that data storage systems of smaller scale than those currently available in the art can be realized.

Another advantage of the present invention is that electrostatically actuated data storage systems can be operated at low voltages.

Another advantage of the present invention is that external vibrations felt by a data storage system can be easily damped out of the movement of a data storage medium within a data storage system because the frequencies of the moving elements are determined primarily by electrical potentials rather than mechanical spring constants and masses.

Another advantage of the present invention is that relatively high stress levels within a data storage system can be accommodated.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the invention. Furthermore, like reference numerals designate corresponding parts throughout the several views.

FIG. 4 is an illustration of an implementation of the translator electrodes of FIG. 2C.

FIGS. 5A–5G depict a side view of the storage component of FIG. 2A, as the storage component is being microfabricated according to the microfabrication process of the present invention.

DETAILED DESCRIPTION OF THE INVENTION

Figure 1A:
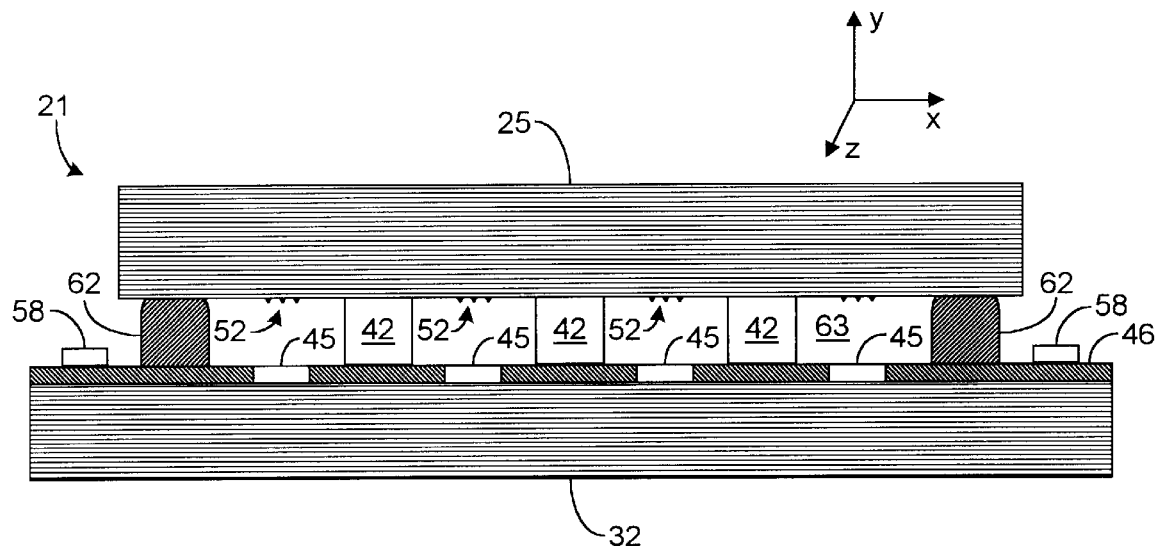
FIG. 1A is an cross sectional view of a data storage system microfabricated in accordance with the invention.
Figure 1B:
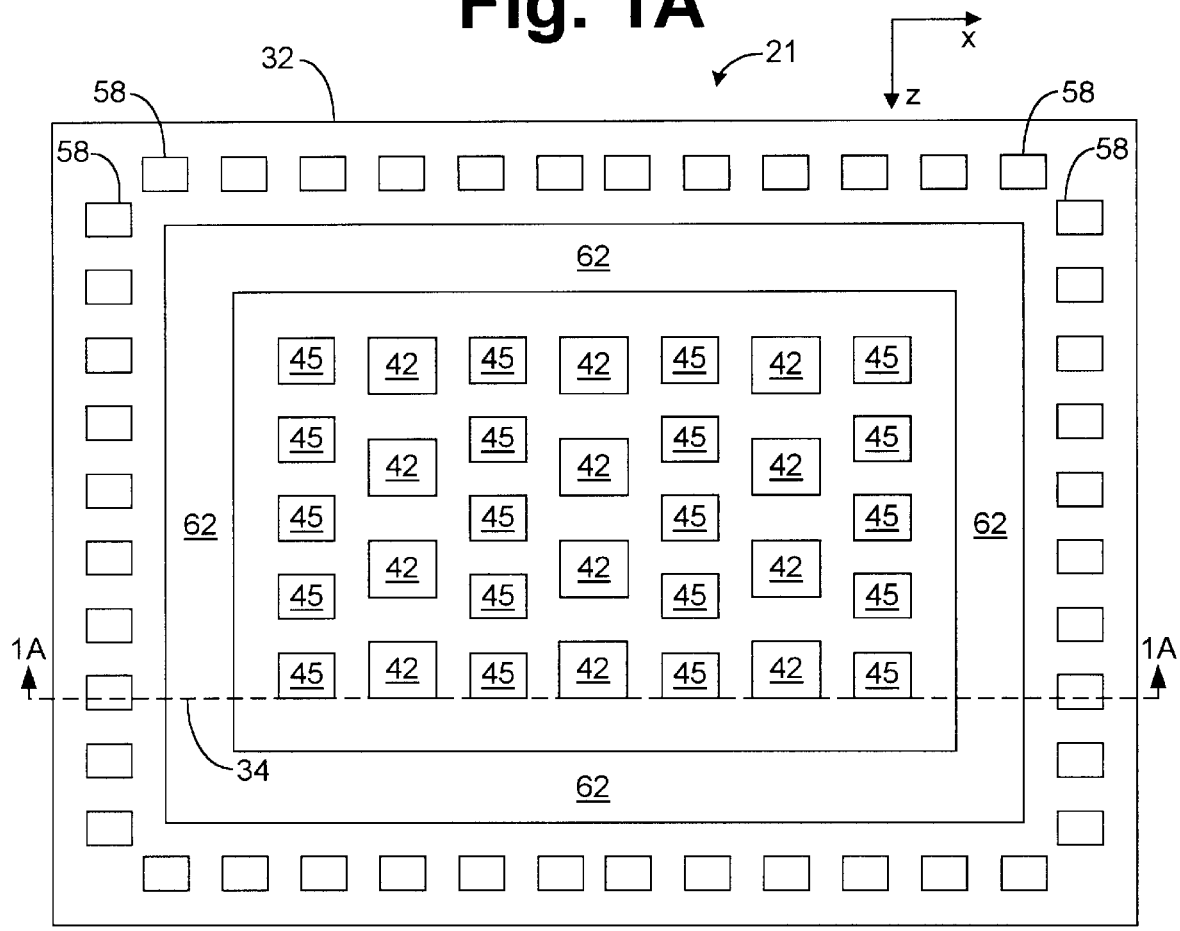
FIG. 1B is a top view of the bottom wafer depicted in FIG. 1A, with the top wafer removed for illustrative purposes.
Figure 1C:
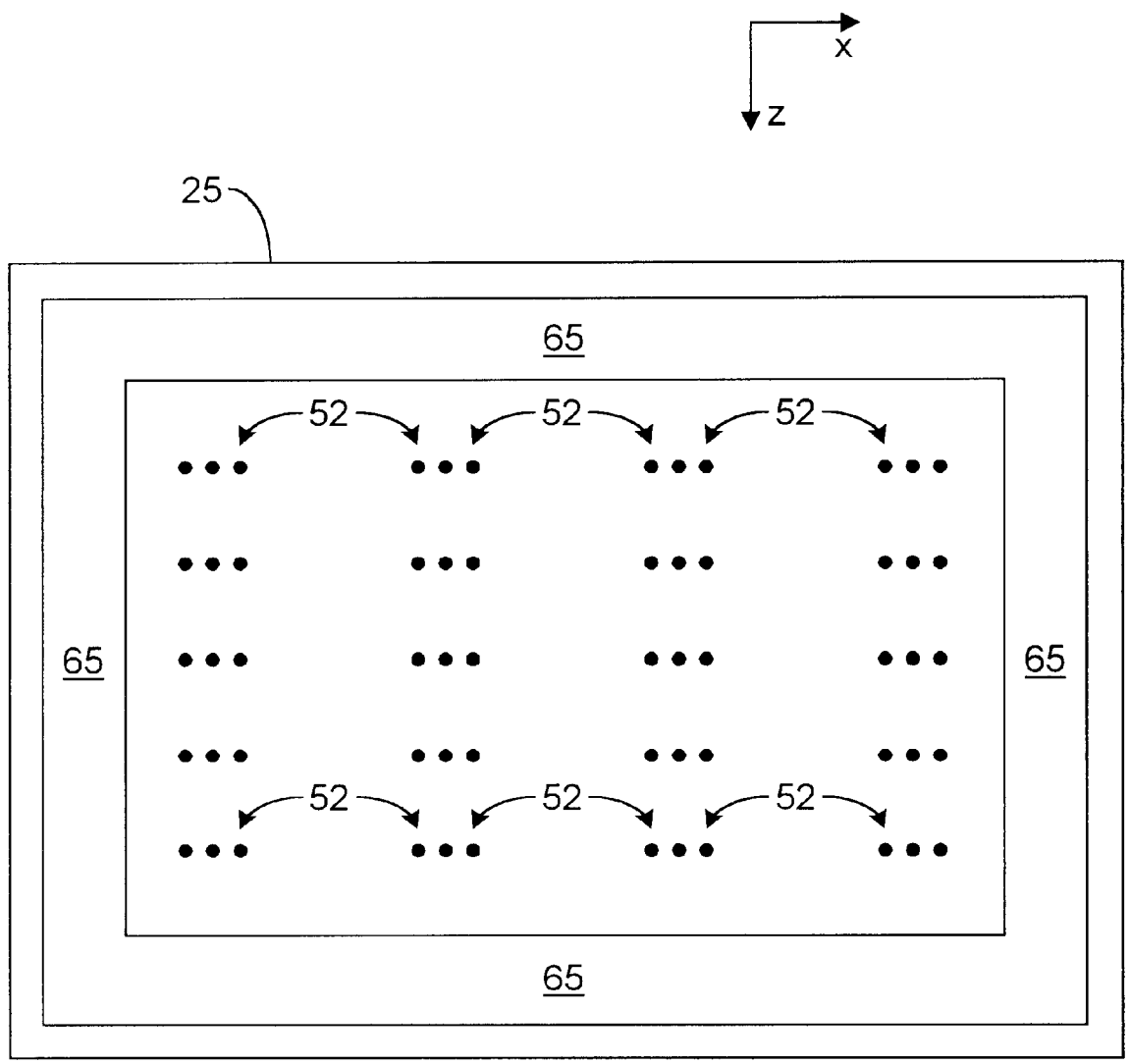
FIG. 1C is a bottom view of the top wafer depicted in FIG. 1A, with the bottom wafer, contacts, circuitry and gasket removed for illustrative purposes.

Generally described, the present invention is a system and method for forming an electrostatically actuated data storage device. FIGS. 1A–1C depict a micromachined system 21 manufactured in accordance with the invention. Although not necessary for successful implementation of the present invention, the system 21 is preferably manufactured according to the process described in copending U.S. Patent Application entitled "System and Method for Bonding and Sealing Microfabricated Wafers to Form a Single Monolithic Structure Having a Vacuum Chamber Therein," filed on Jul. 29, 1998 by Merchant et al. and assigned Ser. No. 09/124,311.

FIG. 1A depicts a cross-sectional view of the system 21 having a top micromachined structure or wafer 25 and a base micromachined structure or wafer 32. Furthermore, FIG. 1B depicts a top view of the wafer 32, and FIG. 1C depicts a bottom view of the wafer 25.

Referring to FIG. 1A, the system 21 is preferably designed to include contacts 42 in order to bond wafer 25 to wafer 32 and to maintain a position of wafer 25 with respect to wafer 32. In this regard, wafer 32 preferably includes a plurality of storage components 45, which will be discussed in further detail below, capable of storing data information. The storage components 45 are preferably disposed within a layer 46 of silicon. Although other embodiments are possible, using a silicon layer 46 provides good mechanical support and a good electrical connection for data storage components 45.

The top wafer 25 preferably includes tips 52, or other types of writing mechanisms, that are configured to alter the properties of the storage components 45 in order to store data. For example, each tip 52 may transmit a laser or an electron beam to a particular location on a respective storage component 45 in order to store data on the respective storage component 45. Therefore, it is desirable for the position of the tips 52 relative to the storage components 45 be maintained within precise tolerances. By maintaining the position of wafer 25 with respect to wafer 32, the contacts 42 maintain the position of the tips 52 relative to the storage components 45. It should be noted that distance between the tips 52 and the respective storage components 45 is preferably between approximately 300 to 2000 Angstroms, and the drawings greatly exaggerate this distance for illustrative purposes.

FIGS. 1A and 1B show electrical contacts 58, which are preferably designed to provide an outside interface to the storage components 45 in the preferred embodiment. In this regard, electrical connections connect each contact 58 to a particular storage component 45 within structure 21, although the connections are not shown by FIGS. 1A and 1B for simplicity. Therefore, electrical signals can communicate between outside sources and the storage components 45 within structure 21 via electrical contacts 58.

Moreover, in the preferred embodiment, the system 21 is configured to include at least one column or contact 42, preferably comprising palladium (Pd). The contacts 42 are preferably formed on wafer 32 or a layer of wafer 32 through normal micromachining techniques. Once formed on wafer 32, the contacts 42 are then bonded to the top wafer 25 in order to connect wafer 32 to wafer 25. Preferably, the top wafer 25 has a silicon (Si) surface so that the contacts 42 engage and are bonded to silicon included within top wafer 25, thereby forming a palladium-silicon (PdSi) bond between wafers 25 and 32. An example of a process of creating a palladium-silicon bond between two wafers is fully described in "System and Method for Bonding Wafers," filed by Merchant et al. on (to be determined) and assigned serial number (to be determined).

In this regard, the palladium contacts 42 are preferably attached to the base wafer 32 or to a layer of the base wafer 32 via an adhesion layer of chromium. The contacts 42 are configured to engage a silicon portion of the wafer 25. When the temperature of the wafers 25 and 32 are annealed at certain temperatures (e.g., approximately 300 degrees Celsius for about 45 minutes, approximately 400 degrees Celsius for about 30 minutes or approximately 450 degrees Celsius for about 30 minutes), a palladium-silicon (PdSi) bond forms between the palladium contacts 42 and the silicon portion of wafer 25.

Since the palladium contacts 42 may be bonded to silicon at temperatures less than approximately 500 degrees Celsius, the palladium-silicon bond between the two wafers 25 and 32 can be formed without damaging any CMOS (complementary metal-oxide semiconductor) storage components or other temperature sensitive components included within either of the two wafers 25 or 32. Therefore, the bonding process is compatible with CMOS components, and wafers 25 and 32 may include CMOS components (or other components sensitive to temperatures above approximately 500 degrees Celsius) during the bonding process.

In addition to contacts 42, the system 21 is preferably designed to include a gasket 62 for sealing the system 21. The gasket 62 is configured to engage both wafers 25 and 32 and to enclose a portion of the space between wafer 25 and 32, as depicted by FIGS. 1A and 1B. The space encompassed by gasket 62 and wafers 25 and 32 defines a chamber 63 within system 21. Storage components 45 preferably reside in this chamber 63 so that a vacuum, or other types of conditions, may be formed and sealed around the storage components 45, as will be discussed in more detail below. The gasket 62 is preferably configured to constitute a side wall of the chamber 63, as shown by FIG. 1B.

The material of the gasket 62 preferably is a soft pliable material. Furthermore, although other embodiments are possible, gasket 62 is preferably taller than contacts 42. Therefore, gasket 62 is preferably designed to engage wafer 25 before contacts 42 engage wafer 25. After engaging the wafer 25, the gasket 62 is designed to deform as the two wafers 25 and 32 are being pressed together, until the wafer 25 also engages the contacts 42. Heating the joined wafers 25 and 32 forms the bond between contacts 42 and fuses the gasket 62 with wafer 25. When the structure 21 is cooled, the fused material hardens to form a seal for the chamber 63. Consequently, the heating of the system 21 not only forms the bond between the contacts 42 and the wafer 25, but it also seals the chamber 63.

To help create a void free seal, a germanium layer 65 is preferably formed on wafer 25 as depicted by FIG. 1C. The germanium layer 65 is configured to engage the gasket 62 when wafer 25 is joined with wafer 32. The germanium layer 65 is configured to fuse with the gasket 62 at temperatures used during the bonding process and, therefore, to help form a seal around structure 21. For the purposes of the invention, a sufficient seal is a seal capable of maintaining vacuum conditions within chamber 63.

In the preferred embodiment, the material of the gasket 62 is preferably gold (Au). Therefore, when the gasket 62 is engaged with wafer 25 and heated, the surfaces of gasket 62 and wafer 25 engaged together form an eutectic which has a melting point close to or lower than the bonding temperature. If the germanium layer 65 is formed on wafer 25, then a gold-germanium (AuGe) eutectic is formed at the interface of the gasket 62 and layer 65. Otherwise a gold-silicon (AuSi) eutectic is formed inside the surface of wafer 25 is preferably silicon. When the eutectic cools and solidifies, a leak-proof seal is formed between the wafers 25 and 32 by the hardened eutectic and gasket 62.

In the preferred embodiment, it is desirable for the chamber 63 sealed by gasket 62 to be evacuated. In such a situation, the structure 21 should be placed in a vacuum chamber while bonding of the two wafers 25 and 32 is performed. By engaging and heating the wafers 23 and 32 as discussed above while the system 21 is situated within an evacuated vacuum chamber, the chamber 63 is sealed while the chamber 63 is evacuated.

Storage Components

Figure 2A:
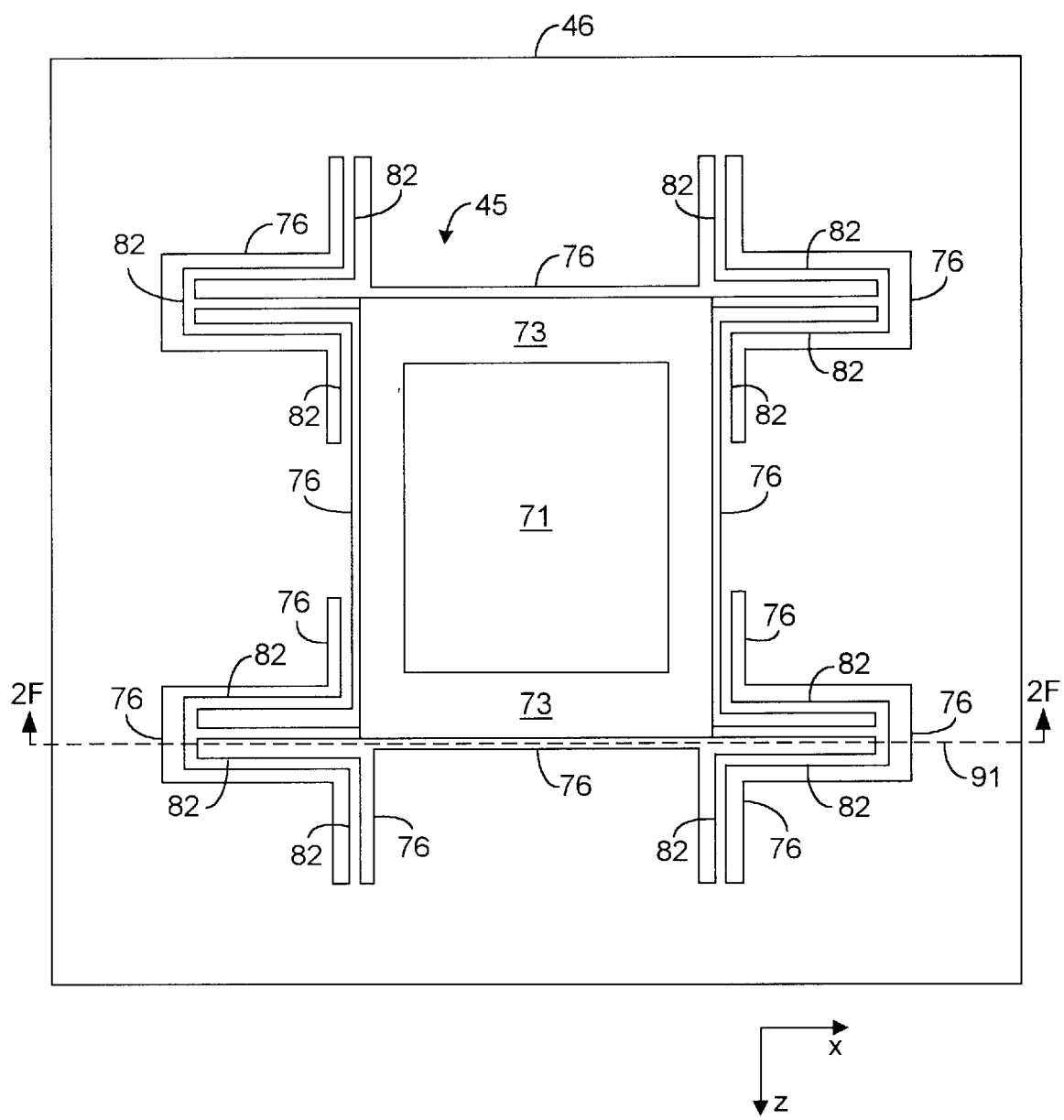
FIG. 2A is a top view of one of the storage components of FIG. 1A in accordance with the preferred embodiment of the present invention.

FIGS. 2A–2I depict a storage component 45 of the invention. FIG. 2A depicts a top view of the storage component 45 (i.e., the surface of storage component 45 that faces tips 52 in FIG. 1A). The storage component 45 includes a data storage medium 71 capable of storing data information. In this regard, tips 52 corresponding to the medium 71 (i.e., located directly above the medium 71) are designed to alter the properties of medium 71 at particular locations on medium 71 in order to store data. For example, the tips 52 can transmit a laser, an electron beam, an electrical field, or any other suitable type of transmission in order to alter a particular property of the material of the medium 71. By changing the properties of the material of the medium 71 to reflect data patterns, different data patterns can be stored on the medium 71.

Although other embodiments are possible, each storage component 45 is preferably surrounded by a layer 46 of silicon. The silicon layer 46 preferably includes a cavity 76. This cavity 76 can be formed by patterning the silicon layer 46 through conventional microfabrication techniques known in the art. Flexures 82 are formed in the cavity 76 and are connected to a movable support 73, preferably comprised of silicon, and to the silicon layer 46, as depicted by FIG. 2A. The flexures 82 are designed to allow motion of the movable support 73 and, hence, medium 71 within a plane parallel to the surface of the wafer 25 that is adjacent to the tips 52 (i.e., motion in the xz-plane), and the flexures 82 are designed to significantly resist motion of the medium 71 out of this plane (i.e., motion in the y-direction).

Figure 2B:
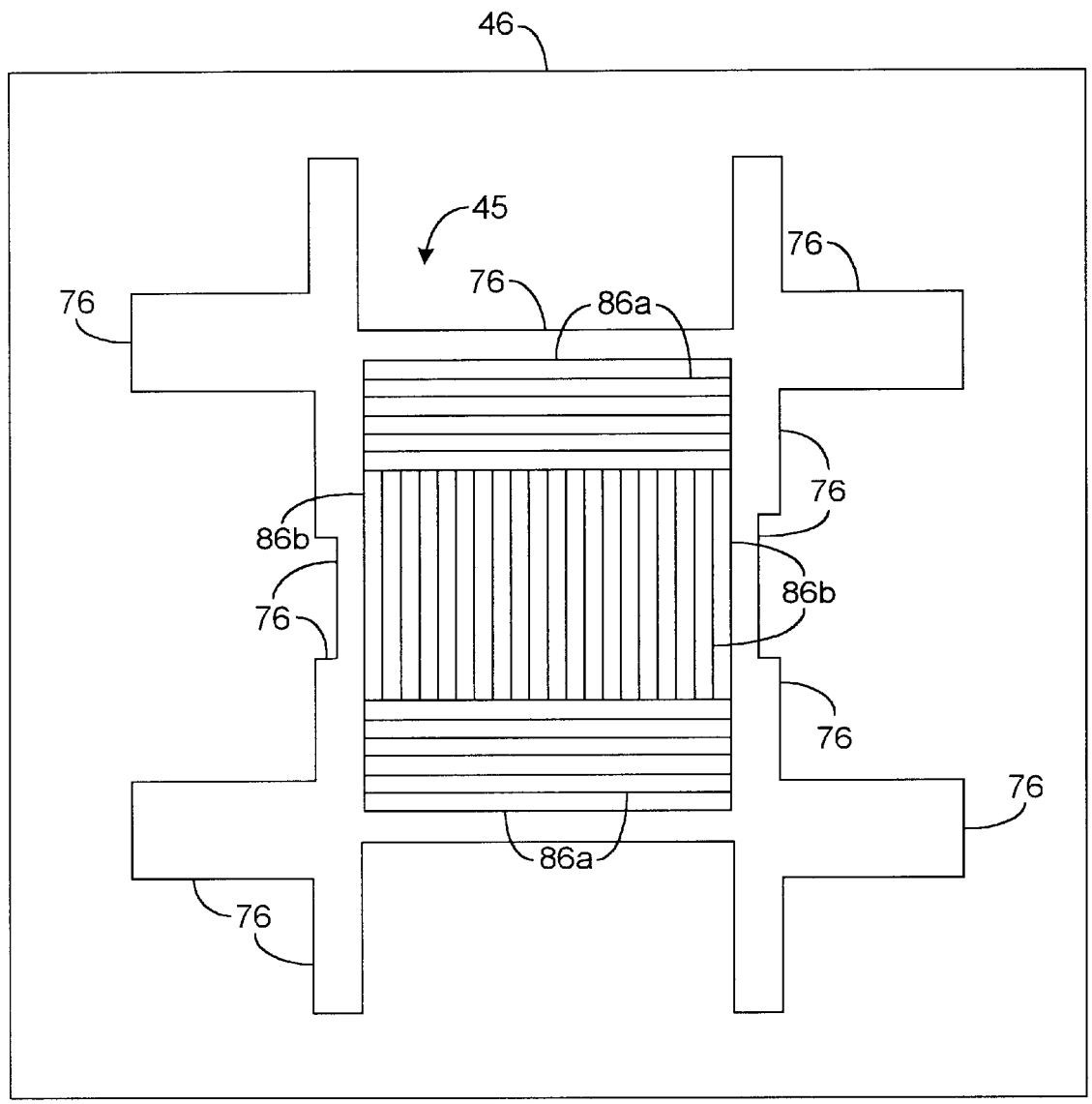
FIG. 2B is a top view of the storage component of FIG. 2A with the data storage medium, flexures, movable support, and translator electrodes removed for illustrative purposes.

FIG. 2B depicts a top view of the storage component 45 and a surrounding portion of the layer 46 with the medium 71, movable support 73, and flexures 82 removed in order to expose an array of stator electrodes 86a and an array of stator electrodes 86b, which are formed on wafer 32 or on a layer of wafer 32. Each stator electrode 86a and 86b depicted by FIG. 2B may be a single electrode or a plurality of electrodes. Each stator electrode 86a and 86b is configured to generate an electrical field when a voltage is applied to the electrode 86a and 86b. Preferably a repeating spatially alternating voltage pattern is applied to the stator electrodes 86 in order to create a spatially alternating electrical field, which will be discussed in further detail below. Furthermore, stator electrodes 86a are preferably configured to extend in a direction perpendicular to the stator electrodes 86b, as depicted by FIG. 2B. However, stator electrodes 86a may extend in other directions relative to stator electrodes 86b.

Figure 2C:
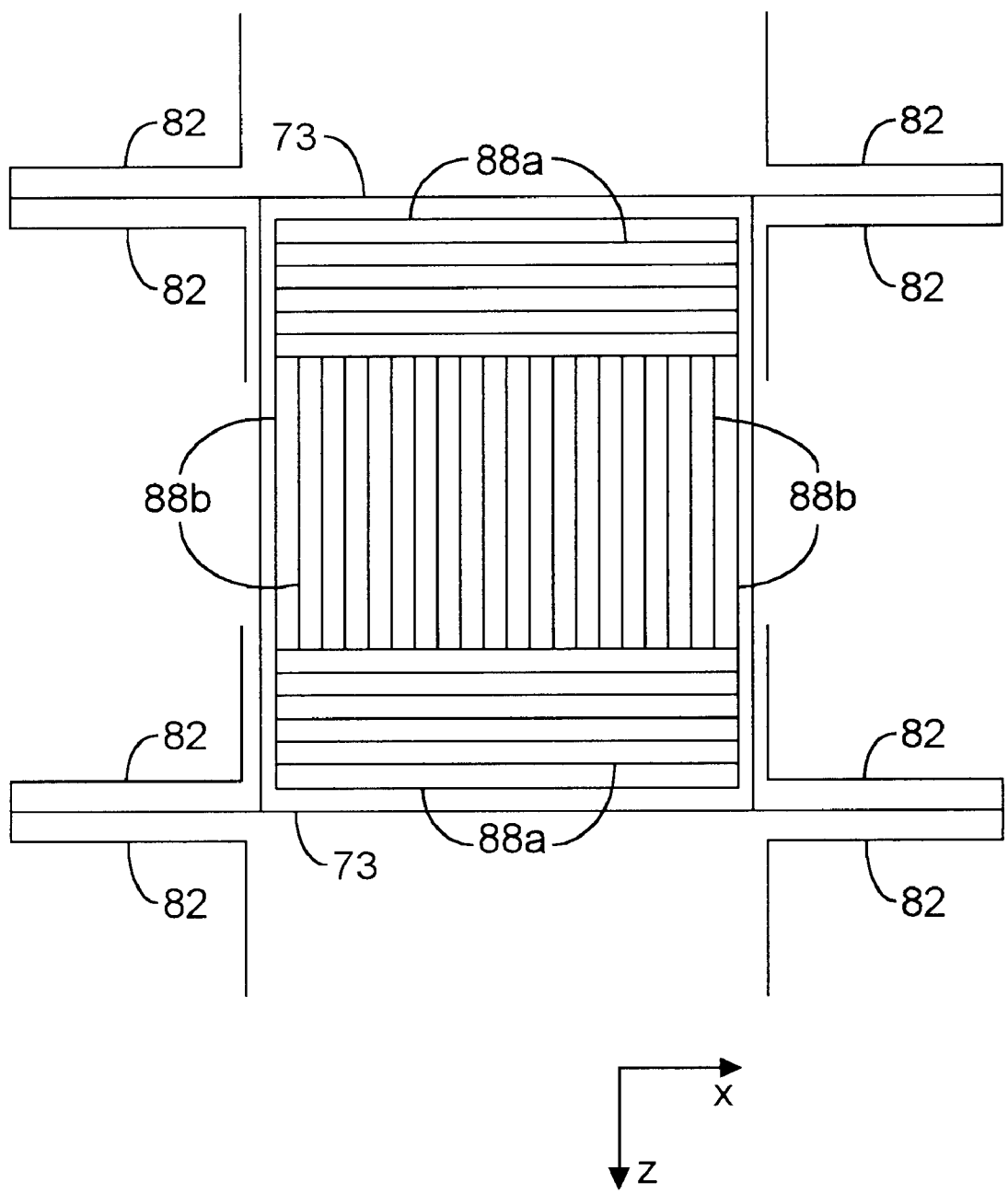
FIG. 2C is a bottom view of the movable support of FIG. 2A showing the translator electrodes that are attached to the bottom surface of the movable support.

FIG. 2C depicts a bottom surface of the movable support 73 (i.e., the surface of movable support 73 that faces stator electrodes 86a and 86b) and the bottom surface of the flexures 82 which connect the movable support 73 to the layer 46 (FIG. 2A). The bottom surface of the movable support 73 includes an array of translator electrodes 88a and an array of translator electrodes 88b. Each translator electrode 88a or 88b depicted by FIG. 2C may be a single electrode or a plurality of electrodes. Similar to the stator electrodes 86a and 86b, the translator electrodes 88a are preferably configured to extend in a direction perpendicular to the translator electrodes 88b, as depicted by FIG. 2C, although other implementations are also possible. Each translator electrode 88a and 88b is also configured to generate an electrical field when a voltage is applied to the translator electrode 88a and 88b. Furthermore, as depicted by FIGS. 2B and 2C, the placement of the translator electrodes 88a and 88b is configured to correspond to the stator electrodes 86a and 86b. Therefore, in order to increase the efficiency of movement of medium 71, which will be discussed in detail below, the translator electrodes 88a preferably extend in the same direction as the stator electrodes 86a, and the translator electrodes 88b preferably extend in the same direction as stator electrodes 86b.

Although other patterns are possible, a spatially alternating voltage pattern is preferably applied to the translator electrodes 88a and 88b. For example, in the preferred embodiment, every other translator electrode 88a or 88b is held at a certain voltage (e.g., five volts), while the intervening electrodes are held at another voltage (e.g., zero volts). The voltage pattern of the translator electrodes 88 is preferably held constant. Therefore, every other translator electrode 88a and every other translator electrode 88b can be hardwired to a particular voltage, and the other electrodes 88a and 88b can be hardwired to a different voltage. In the preferred embodiment, electrical conductors located on the surface of the flexures 82 provide electrical connections from the silicon layer 46 to the translator electrodes 88a and 88b.

Figure 2D:
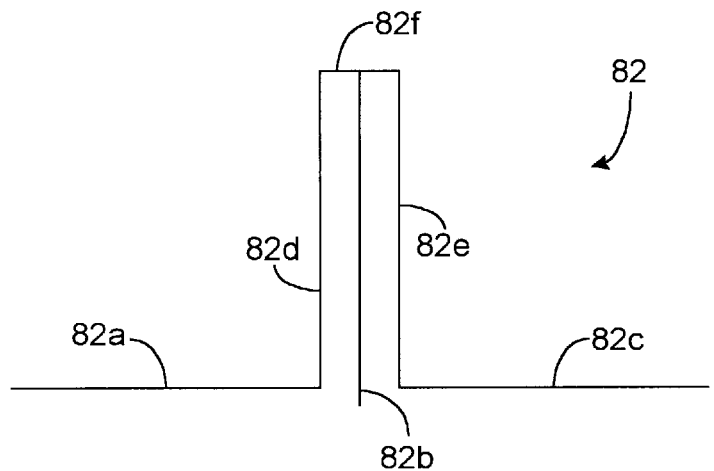
FIG. 2D is a top view of the flexures of FIG. 2A.
Figure 2E:
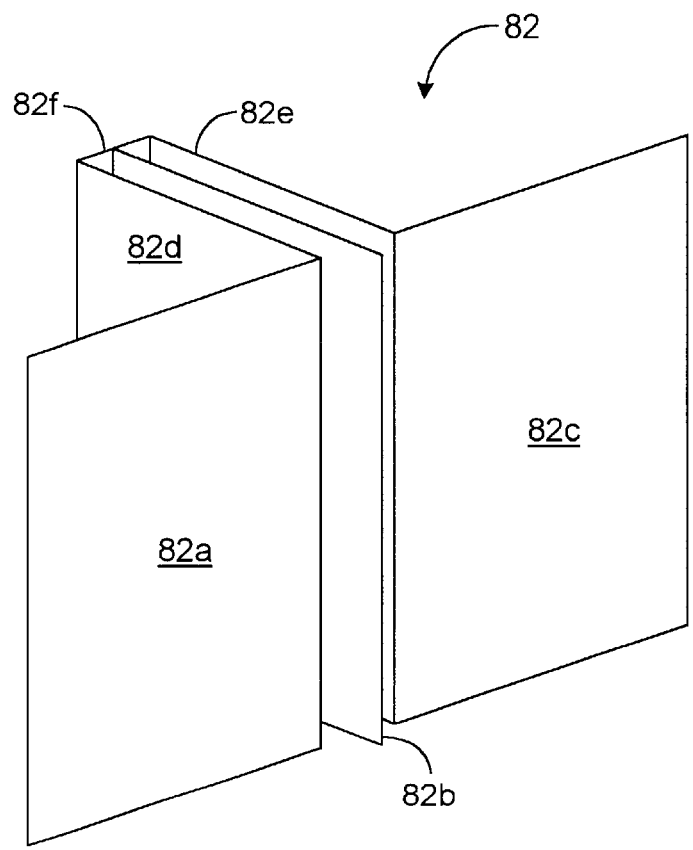
FIG. 2E is a three dimensional side view of the flexures of FIG. 2D.

FIG. 2D depicts a top view of flexures 82, and FIG. 2E depicts a three dimensional side view of flexures 82. Although other embodiments are possible, each flexure 82 preferably includes at least three interconnected beams or panels 82a, 82b and 82c. An edge of two panels 82a and 82c is preferably coupled to the silicon layer 46, as depicted by FIG. 2A. Panel 82b is preferably coupled to the movable support 73 to support the movable support. Panels 82a, 82b and 82c are preferably interconnected via panels 82d, 82e and 82f, as depicted by FIGS. 2D and 2E. The design of flexures 82 allows the movable support and, hence, the medium 71 to move in a direction in a plane parallel with the adjacent surfaces of wafers 25 and 32 (i.e., in the xz-plane) with relatively little resistance but significantly resists any motion of the medium 71 in a direction perpendicular to this plane (i.e., in the y-direction).

Although other implementations are possible, panels 82a and 82c are preferably formed perpendicular to panel 82b in order to allow the movable support 73, and the medium 71 to move freely in a two-dimensional plane parallel to the surface of the medium 71. Panel 82b is preferably coupled to panel 82f, and panels 82d and 82e preferably connect panels 82a and 82c, respectively, to panel 82f.

Figure 2F:
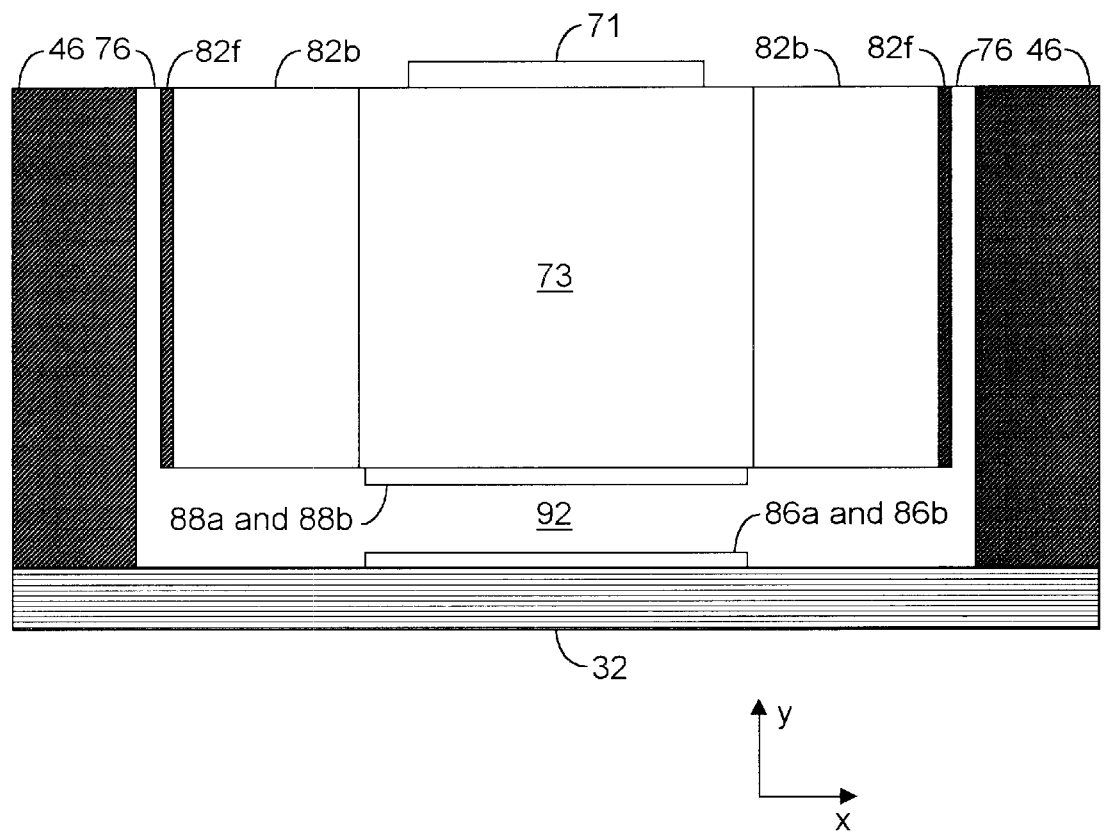
FIG. 2F is a cross sectional view of the storage component of FIG. 2A.

FIG. 2F depicts a cross sectional view of the storage component 45. As can be seen by FIG. 2F, the medium 71 is disposed on top of and connected to movable support 73, and flexure panel 82b of each flexure 82 is coupled to the movable support 73. The translator electrodes 88a and 88b on the bottom surface of the movable support 73 are designed to face the stator electrodes 86a and 86b, and a gap 92 exists between the stator electrodes 86a and 86b and the translator electrodes 88a and 88b. Furthermore, the gap 76 also exists between flexures 82 and the surrounding silicon layer 46, except where the edges of panels 82a and 82c are connected to the silicon layer 46. The gap 76 between the flexures 82b and silicon layer 46 is designed to allow the movable support 73 to move without causing flexures 82 to engage the silicon layer 46 and, thereby, impede the motion of the movable support 73 and the medium 71.

Figure 2G:
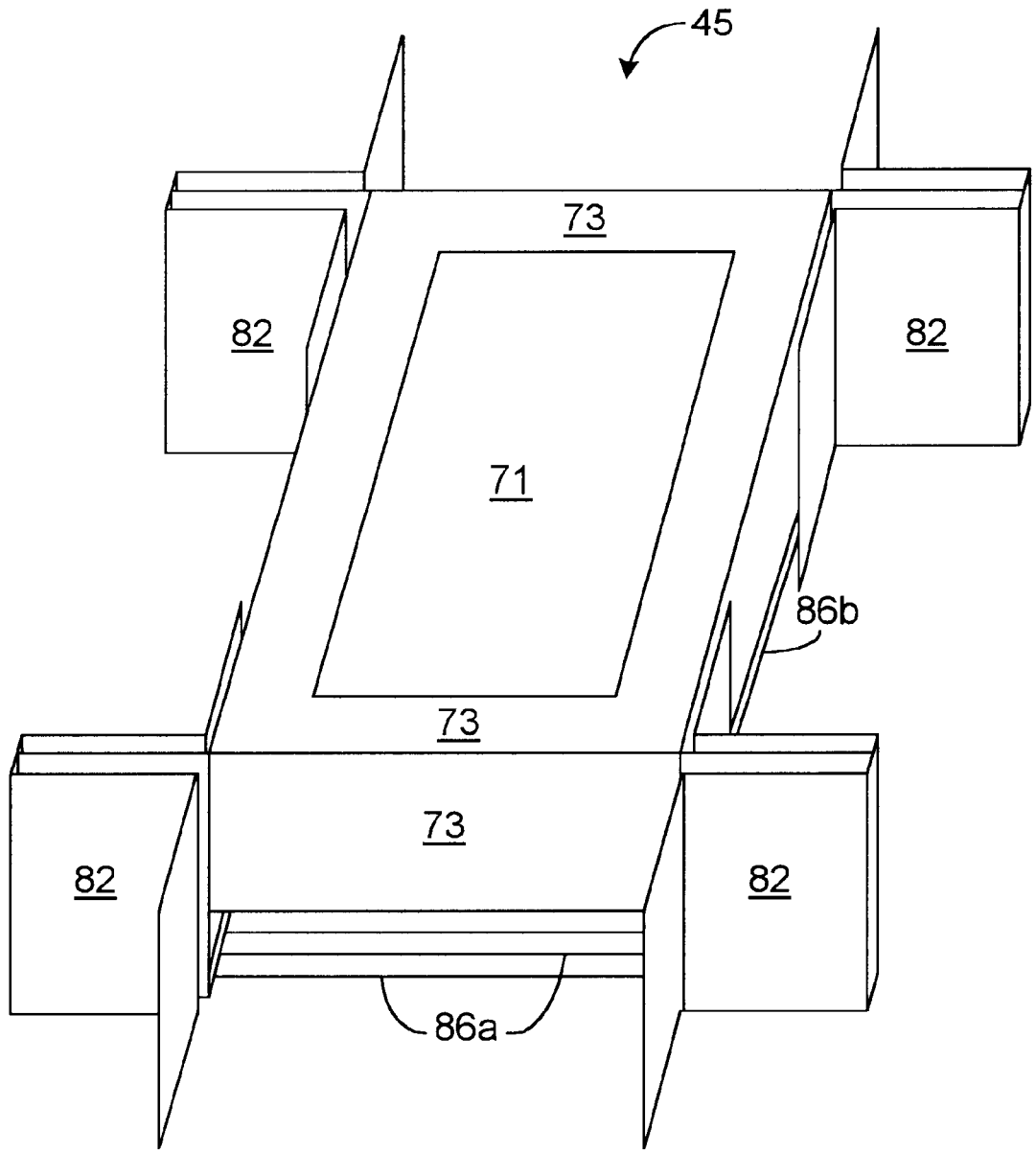
FIG. 2G is a three dimensional view of the storage component of FIG. 2A with the surrounding silicon layer removed for illustrative purposes.
Figure 2H:
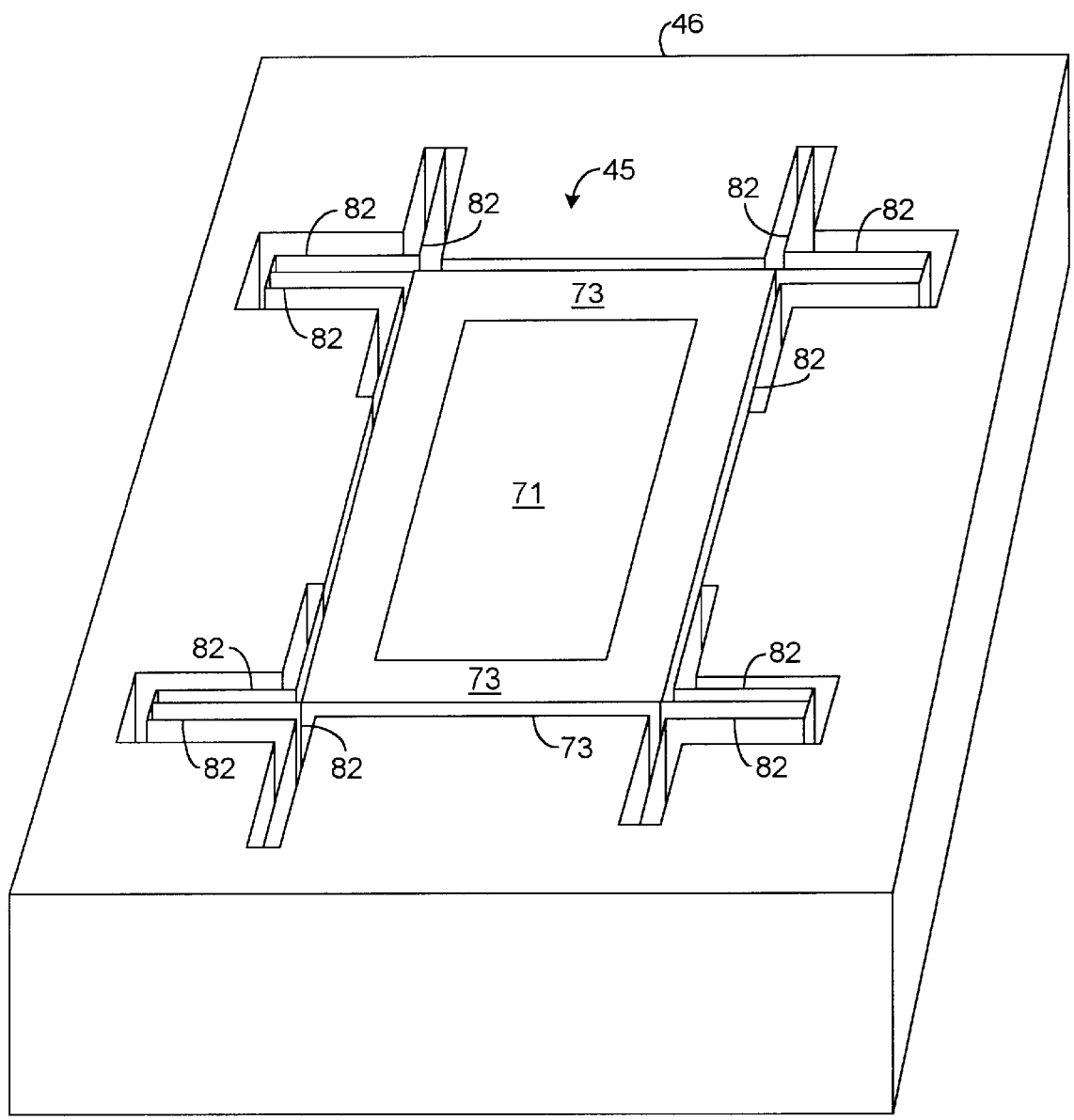
FIG. 2H is a three dimensional view of the storage component of FIG. 2G surrounded by a portion of the silicon layer.

To further illustrate the preferred embodiment, FIG. 2G depicts a three dimensional side view of the storage component 45 with the silicon layer 46 removed for simplicity, and FIG. 2H depicts the storage component 45 of FIG. 2G and a portion of the silicon layer 46 that surrounds the storage component 45.

The medium 71 is designed to move with respect to the tips 52 (FIG. 1A) in order to store and read data to and from different locations on the medium 71. The movement of the medium 71 is controlled by the stator electrodes 86a and 86b and the translator electrodes 88a and 88b. When one of the tips 52 is to write or read data to or from a particular location on the medium 71, the stator electrodes 86a and 86b and the translator electrodes 88a and 88b are designed to move the medium 71 until the particular location on the medium 71 is located directly beneath the tip 52.

In this regard, a spatially alternating voltage pattern is applied to the stator electrodes 86a and 86b and the translator electrodes 88a and 88b to generate a spatially alternating electrical field. The voltage pattern applied to the translator electrodes 88a and 88b is designed such that every other translator electrode 88a and 88b is held at a certain voltage (e.g., five volts) while the intervening translator electrodes 88a and 88b are held at another certain voltage (e.g., zero volts). The spatially alternating voltage pattern generates a spatially alternating electrical field.

Moreover, a spatially alternating voltage pattern is preferably applied to the stator electrodes 86a and 86b. Similar to the spatially alternating voltage pattern applied to the translator electrodes 88a and 88b in the preferred embodiment, the repeating spatially alternating voltage pattern of the stator electrodes 86a and 86b can be implemented by applying a certain voltage on every other stator electrode 86a and 86b and applying a different voltage on the intervening electrodes 86a and 86b. However, unlike the design of the translator electrodes 88a and 88b, the spatially alternating voltage pattern of the stator electrodes 86a and 86b is preferably disrupted at certain location and repeats at the disrupted locations. Therefore, phase inversions occur in the voltage pattern of the stator electrodes 86a and 86b.

Figure 3A:
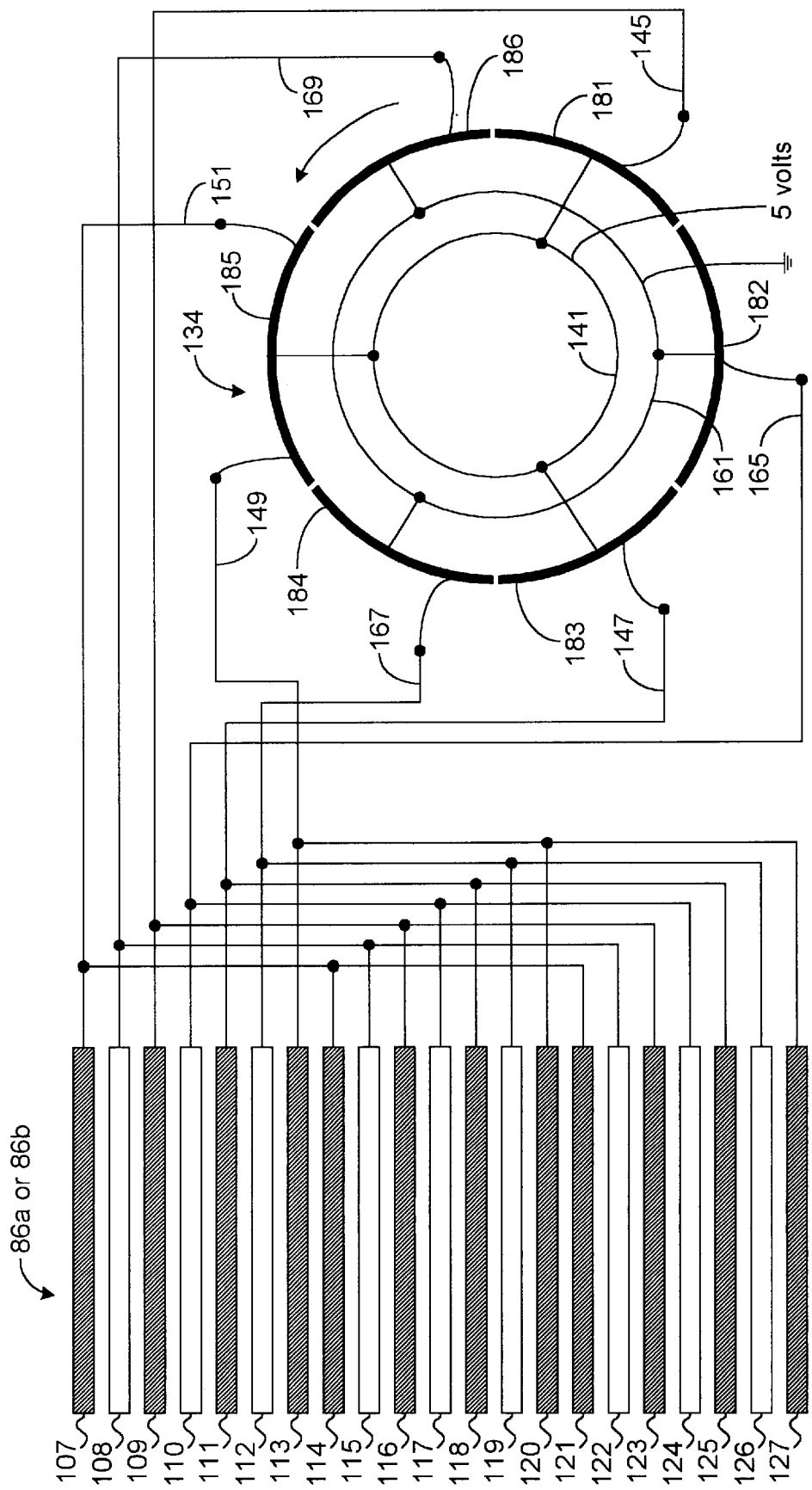
FIG. 3A is an illustration of a device that may be used to generate and step electrical potentials across the stator electrodes of FIG. 2B.

For illustrative purposes, assume that the repeating alternating voltage pattern of the stator electrodes 86a and 86b is designed to repeat every seventh consecutive electrode 86a and 86b. FIG. 3A depicts a portion of the array of stator electrodes 86a or 86b where an alternating voltage pattern is designed to repeat every seventh consecutive electrode of the array of stator electrodes 86a or 86b. In this case, five volts, for example, is applied to the stator electrodes 107, 109, 111, and 113, and zero volts, for example, is applied to the stator electrodes 108, 110, and 112. This voltage pattern is alternating. However, after the seventh stator electrode 113, the voltage pattern repeats. Therefore, the eighth stator electrode 114 has the same voltage as the seventh stator electrode 113, and the alternating voltage pattern previously described begins with the eighth stator electrode 114. Accordingly, the stator electrodes 116, 118, and 120 have the same voltage as the seventh and eighth stator electrodes 113 and 114, and the stator electrodes 115, 117, and 119 have the same voltage as the stator electrodes 108, 110, and 112. Thus, the strictly alternating pattern is "repeated" at the eighth stator electrode 114, and a phase inversion occurs at the eighth stator electrode 114.

Similarly, another phase inversion occurs at stator electrode 121, and the alternating voltage pattern repeats again at the stat or electrode 121. Accordingly, stator electrodes 121, 123, 125, and 127 have five volts applied thereto, and stator electrodes 122, 124, and 126 have zero volts applied thereto.

The interaction between the electrical fields generated by the voltage patterns of the translator electrodes 88a and 88b and stator electrodes 86a and 86b induces a force on the translator electrodes 88a and 88b, and thus, the movable support 73 and medium 71, that pulls these components toward a particular location. The voltage patterns applied to the stator electrodes 86a and 86b can be stepped in one direction by changing the voltage on certain electrodes 86a or 86b. For example, using the initial voltage pattern described in the example above, the voltage patterns can be stepped in one direction by changing the voltage on the first stator electrode 107 and every seventh stator electrode 86a or 86b after the first stator electrode 107.

Figure 3B:
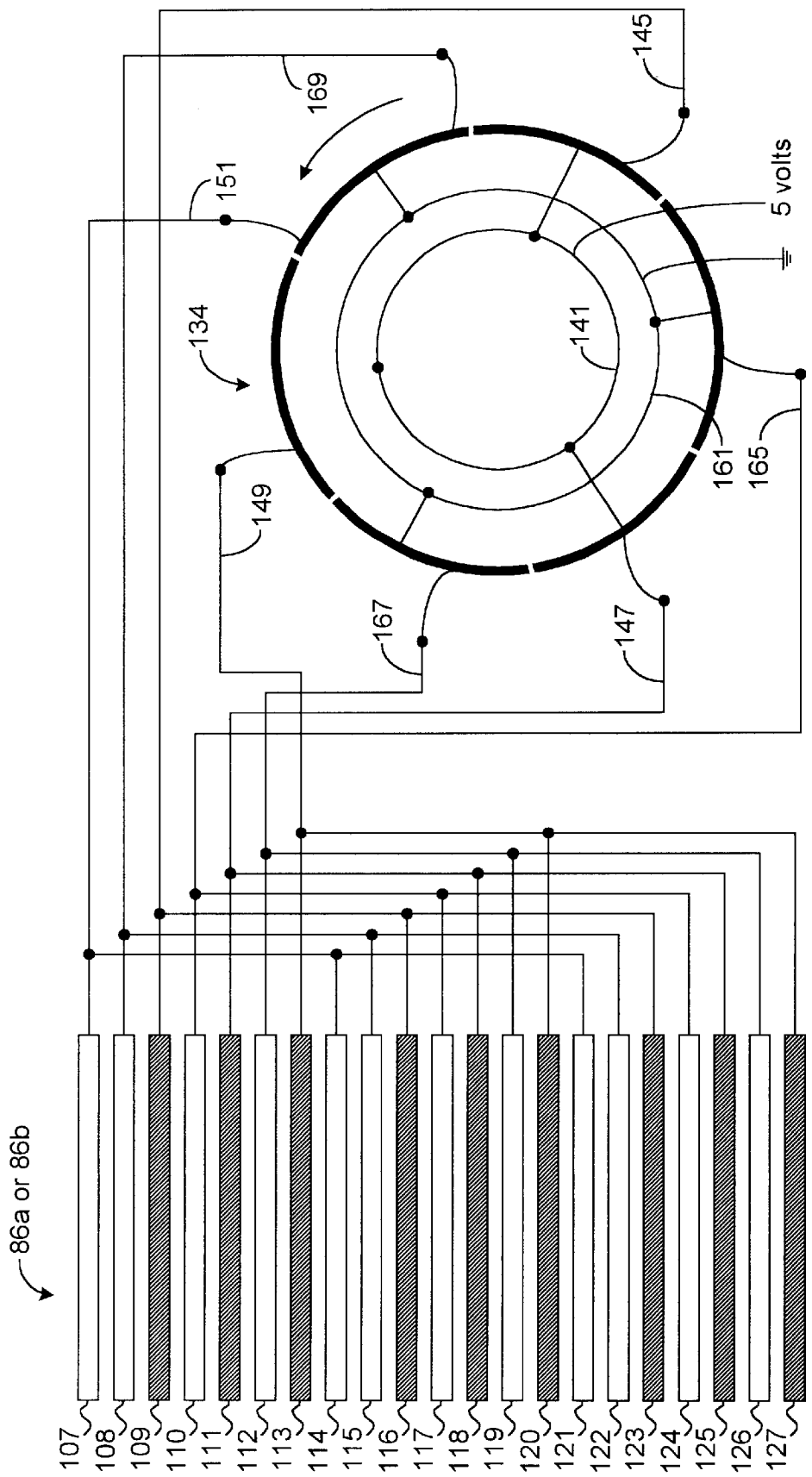
FIG. 3B is an illustration of the device of FIG. 3A after a first step of the electrical potentials of the stator electrodes.
Figure 3C:
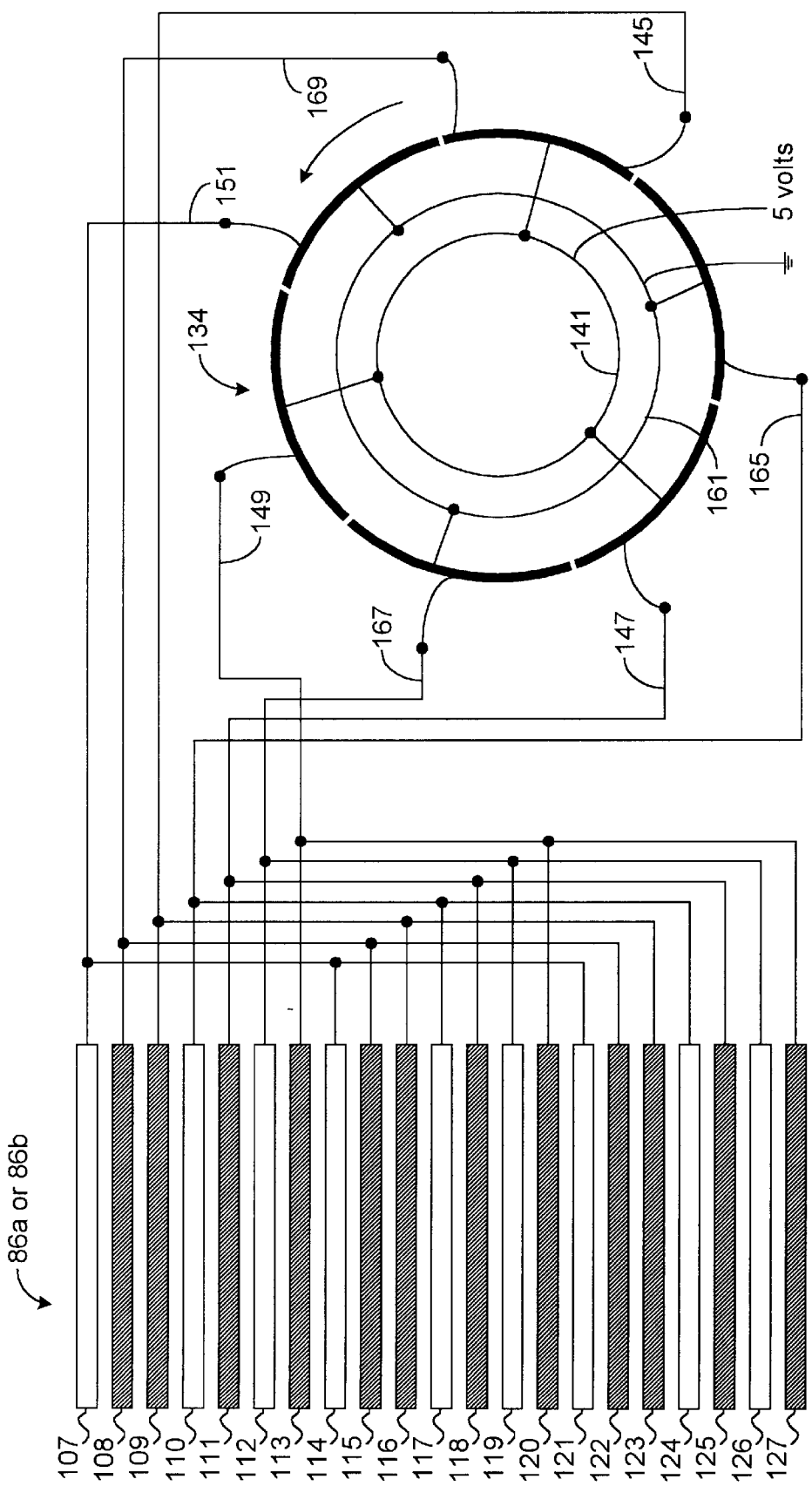
FIG. 3C is an illustration of the device of FIG. 3A after a second step of the electrical potentials of the stator electrodes.

FIGS. 3A–3C depict a device 134 that can be used to implement the functionality of stepping the voltage pattern of the stator electrodes 86a and 86b. The electrodes 86 shown in FIGS. 3A–3C are a portion of either stator electrodes 86a or stator electrodes 86b. For the purposes of illustration, FIGS. 3A–3C depict twenty-one electrodes 86a or 86b, but other numbers of electrodes 86a or 86b are also possible. As shown by FIG. 3A, connection 141 initially is designed to provide a certain voltage (e.g., five volts) to connections 145, 147, 149, and 151. Therefore, the shaded stator electrodes 107, 109, 111, 113, 114, 116, 118, 120, 121, 123, 125, and 127 depicted by FIG. 3A have five volts applied thereto. In addition, connection 161 is designed to provide another voltage (e.g., zero volts or ground) to connections 165, 167, and 169. Therefore, the stator electrodes 108, 110, 112, 115, 117, 119, 122, 124, and 126 without shading in FIG. 3A have zero volts applied thereto. As can be seen by reference to the electrodes 86a or 86b in FIG. 3A, an alternating voltage pattern that repeats after every seventh consecutive electrode 86a or 86b is applied to the stator electrodes 86a or 86b.

The voltage patterns of the stator electrodes 86a or 86b can be stepped by rotating the device 134 in a counter-clockwise fashion. When the device 134 has been rotated enough to cause one of the connections 145, 147, 149, 151, 165, 167, or 169 to switch voltages, the voltage pattern is stepped. For example, in FIG. 3A, connection 151 is designed to be the first connection to switch voltages followed by connections 169, 145, 165, 147, 167, and 149 (in that order) when the device 134 is rotated one-sixth of a revolution. Preferably, the total number of segments 181–186 of device 134 is one fewer than the number of stator electrodes 86a or 86b that define a repeating voltage pattern. Therefore, if the alternating voltage pattern is repeated every seventh consecutive stator electrode 86a or 86b, as described above, the device 134 preferable has six segments 181–186, as depicted by FIGS. 3A–3C.

FIG. 3B depicts the device 134 after connection 151 switches voltage but before connection 169 switches voltage. As can be seen by the electrodes 86a or 86b depicted in FIG. 3B, the electrical potentials applied to three of the stator electrodes 107, 114, and 121 are changed due to the switching of connection 151 from five volts to zero volts. FIG. 3C depicts the device 134 after connection 169 switches voltage but before voltage 145 switches voltage. As can be seen by FIG. 3C, the voltage is applied to three stator electrodes 108, 114, and 122 due to the switching of connection 169 from zero volts to five volts. However, the repeating pattern of the electrodes 86a or 86b has been stepped in a particular direction as can be seen by comparing FIG. 3A to FIG. 3C.

FIG. 4 depicts a possible implementation of the translator electrodes 88a or 88b. For optimal operation, the translator electrodes 88a and 88b are preferably evenly spaced. In addition, the spacing of the translator electrodes 88a and 88b is such that the number of translator electrodes 88a or 88b over a certain distance is either one more or one less than the number of stator electrodes 86a and 86b over the same distance. As can be seen by reference to FIG. 4, every other translator electrode 88a or 88b can be hardwired to a particular voltage (e.g., five volts), while the remaining translator electrodes 88a or 88b are hardwired to another voltage (e.g., zero volts). The interaction between the electrical fields caused by the voltage patterns on the translator electrodes 88a and 88b and the stator electrodes 86a and 86b induces a force on the translator electrodes 88a and 88b that is in an opposite direction to the direction of stepping by the voltages of the stator electrodes 86a or 86b. Consequently, the translator electrodes 88a and 88b and, hence, the movable support 73 with medium 71 move opposite to the direction of stepping of the voltage pattern on the stator electrodes 86a or-86b. It should be noted, however, that it is possible to vary the electrical fields generated by the translator electrodes 88a and 88b, so long as movement of the movable support 73 is enabled.

Since the stator electrodes 86a and 86b extend in the x-direction and the z-direction, respectively, (i.e., perpendicular to one another) and since the translator electrodes 88a and 88b extend in the x-direction and the z-direction, respectively, (i.e., perpendicular to one another), any range of motion within the xz-plane is possible. In this regard, the voltage pattern applied to the stator electrodes 86a is stepped in order to move the medium 71 in the z-direction which is parallel to the surface of wafer 25 and perpendicular to the lengthwise direction of the electrodes 86a, and the voltage pattern applied to the stator electrodes 86b is stepped in order to move the medium 71 in the x-direction, which is parallel to the surface of wafer 25 and perpendicular to the z-direction. In this way, the stator electrodes 86a and 86b and the translator electrodes 88a or 88b are designed to control the movement of the medium 71 in order to properly position the medium 71 with respect to the tips 52.

Together, stator electrodes 86a and 86b and translator electrodes 88a and 88b (along with flexures 82) define what is commonly referred to in the art as a "surface actuator." A surface actuator includes a first set of electrodes separated from a second set of electrodes by a certain distance or gap. By varying the electrical fields generated by at least one of the sets of electrodes, one set of the electrodes moves relative to the other set.

Surface actuators are generally distinguished from other types of actuators in that the adjacent surfaces of the electrodes are substantially parallel to one another and that the moving set of electrodes moves parallel to these adjacent surfaces. Surface actuators usually require additional elements to maintain the spacing between the stator and translator electrodes. Generally, ball bearings, a lubricant layer or sliding contact is used to maintain spacing. In the invention described herein, folded beam flexures 82 are used to maintain spacing between the stator electrodes 86 and the translator electrodes 88. Therefore, the distance or gap between the sets of electrodes remains substantially constant. Surface actuators generate substantial lateral forces at reasonable operating voltages, add no additional area to the device since they are formed underneath the medium 71, and, as described above, can position the medium 71 along two orthogonal directions. Because of these features, surface actuators are preferable over other types of actuators to move medium 71 relative to tips 52. Other types of surface actuators which may be suitable for the invention are disclosed in copending U.S. Patent Application entitled "Electrostatic Actuator With Alternating Voltage Patterns," filed by Hoen et al. on Mar. 15, 1997, and assigned Ser. No. 08/818,209, and U.S. Pat. No. 5,378,954 entitled "Electrostatic Actuator," filed by Higuchi et al. on Feb. 6, 1992, which are both incorporated herein by reference.

The electrical fields induced by the voltage patterns of the translator electrodes 88a and 88b and stator electrodes 86a and 86b create forces having components in the x-direction, y-direction and z-direction. The forces in the y-direction tend to alter the spacing between the tips 52 and the medium 71, and are, therefore, undesirable. These forces can be minimized by applying spatially alternating voltage patterns to both the stator electrodes 86a and 86b and to the translator electrodes 88a and 88b and by selecting an appropriate gap distance between the stator electrodes 86a and 86b and the translator electrodes 88a and 88b. In this regard, it is desirable to keep the ratio of the repeat distance associated with the translator electrodes 88a and 88b and the distance between the stator electrodes 86a and 86b and the translator electrodes 88a and 88b within a certain range. The repeat distance is the distance between the center of a translator electrode 88a or 88b held at a particular voltage and the center of the nearest translator electrode 88a or 88b, respectively, held at approximately the same voltage. In the preferred embodiment where every other translator electrode 88a or 88b is held at the same voltage, the repeat distance is twice the center to center spacing of the translator electrodes 88a and 88b, assuming that the spacing is constant. To minimize the forces in the y-direction, it is desirable to keep the repeat distance divided by the distance between stator electrodes 86a and 86b and translator electrodes 88a and 88b below approximately sixteen.

Figure 2I:
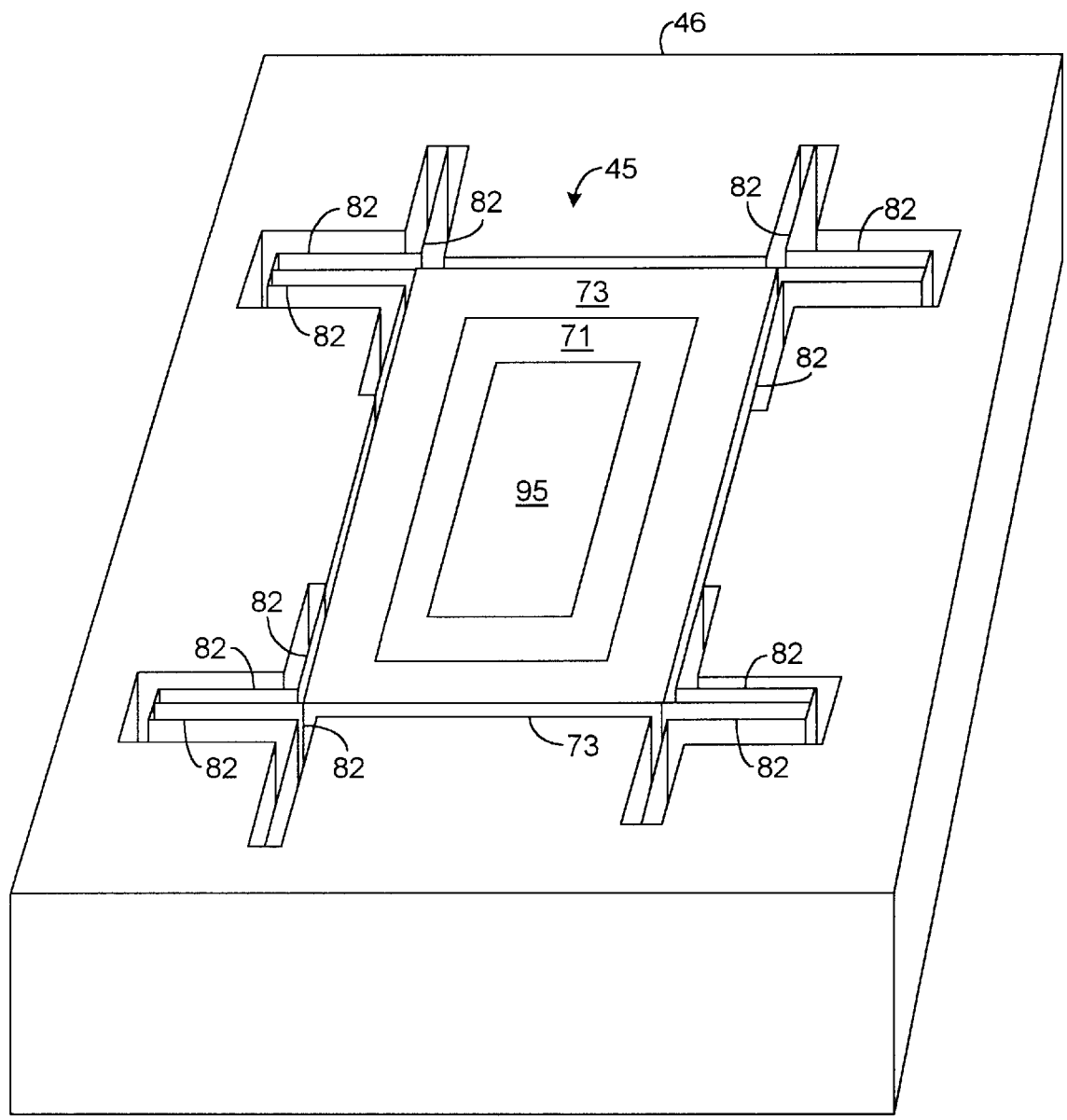
FIG. 2I is a three dimensional view of the storage component of FIG. 2F with a capacitor plate added to the surface of the data storage medium.

It may be desirable for the movable support 73 to include a pull-up capacitor to help offset forces in the y-direction. In this regard, a capacitor plate 95 should be coupled to the movable support 73, as shown in FIG. 2I, and a similar capacitor plate should be formed on the surface of wafer 25 adjacent to the medium 71. The attractive force between the capacitor plates can help to resist motion in the y-direction.

As can be seen by reference to FIG. 1B, system 21 preferably includes a plurality of data storage components 45. Therefore, instead of storing data on a single data storage medium 71, as is typically done in the prior art, data can be stored on a plurality of data storage media 71. Since the data can be stored across a plurality of media 71, the size of each data storage medium 71 can be reduced. Reducing the size of each data storage medium 71 has significant benefits for the manufacture of the device 21. For optimal operation of a tip-based data storage device, the spacing between the tips 52 and medium 71 should be adequately maintained while the medium 71 moves underneath the tips 52. Any bowing of the movable support 73 should be small. However, the movable support 73, since it supports both the medium 71 and the translator electrodes 88, is likely to be connected to a variety of materials. These materials are likely to have different internal stresses, particularly under the influence of temperature changes. The stresses applied to the movable support 73 can cause it to bow.

Reducing the size of the movable support 73 decreases the changes in the separation of the tips 52 and medium 71 caused by the. bow of the medium 71. In the preferred embodiment, each medium 71 can be separated from a respective tip 52 by a distance within a range between approximately 300 to 2000 Angstroms without having perturbations in the movement of the medium 71 cause the medium 71 to engage and damage one of the tips 52. Although other separation distances are possible, it is also desirable to keep the distance between the tips 52 and the medium 71 within this range in order to minimize the distance between the medium 71 and tips 52 while accommodating bowing of the material of movable structure (defined by the data storage medium 71, movable support 73, and translator electrodes 88) when the surface area of the medium 71 is on the order of about 25 square millimeters or less. Accordingly, the small scale of the movable support 73 facilitates microfabrication of the system 21 by enabling minimum separation between the tips 52 and the media 71.

Additionally, the force required to move the media 71 is less when the size of the media 71 is reduced. For example, in the preferred embodiment, the media 71 can be appropriately moved with actuation voltages of less than 7 volts. This relatively small voltage is more desirable since it is compatible with the output levels of CMOS circuitry.

Although the preferred embodiment utilizes a tip-based storage system, other types of storage systems are possible. For example, the medium 71, flexures 82, movable support 73, and electrodes 86 and 88 may be utilized with other data storage systems. These other systems may have reading and writing devices that do not actually contact the surface of medium 71, similar to the design of the tips 52 in the preferred embodiment, or these other systems may have reading and writing devices that do contact the surface of medium 71. Examples of some contact based systems include, but are not limited to, ferroelectric phase change systems, resistance change systems, and thermomechanical systems, and examples of other non-contact based systems include, but are not limited to, tunneling systems, field emission systems, and near-field optimal systems. In any of these other systems, the design of the actuator (i.e., medium 71, flexures 82, movable support 73, the stator electrodes 86a and 86b and the translator electrodes 88a and 88b) can correspond to the design of the preferred embodiment of the present invention.

OPERATION

The preferred use and operation of the present invention is described below with reference to FIGS. 1A–1C, FIGS. 2A–2I, FIGS. 5A–5F, FIG. 6, and FIGS. 7A and 7B.

Formation of the Storage Mechanism

Figure 5A:
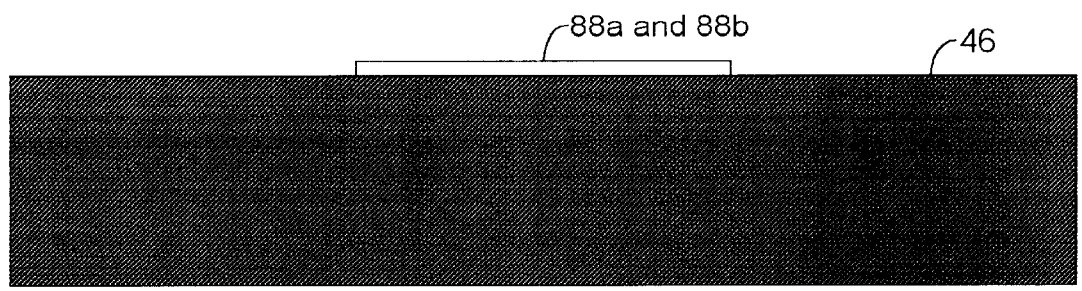

Initially, wafers 25 and 32 are manufactured through microfabrication techniques known in the art. FIGS. 5A–5F and FIG. 6 depict the microfabrication of the data storage components 45 on wafer 32 in accordance with the preferred embodiment of the invention. In this regard, a silicon wafer is initially provided, which constitutes layer 46. Although layer 46 is comprised of silicon in the preferred embodiment, other elements or combination of elements are possible for layer 46. As depicted by FIG. 5A and block 202 of FIG. 6, translator electrodes 88a and 88b are formed on silicon layer 46 via any suitable technique. Preferably, insulating material is included between the translator electrodes 88a and 88b and the silicon layer 46. This insulating material can be formed on the surface of the translator electrodes 88a and 88b prior to attaching the translator electrodes 88a and 88b to the silicon layer 46, or an insulating layer (not shown) can be deposited on the surface of the silicon layer 46 prior to attaching the translator electrodes 88a and 88b to the silicon layer 46.

Figure 5B:
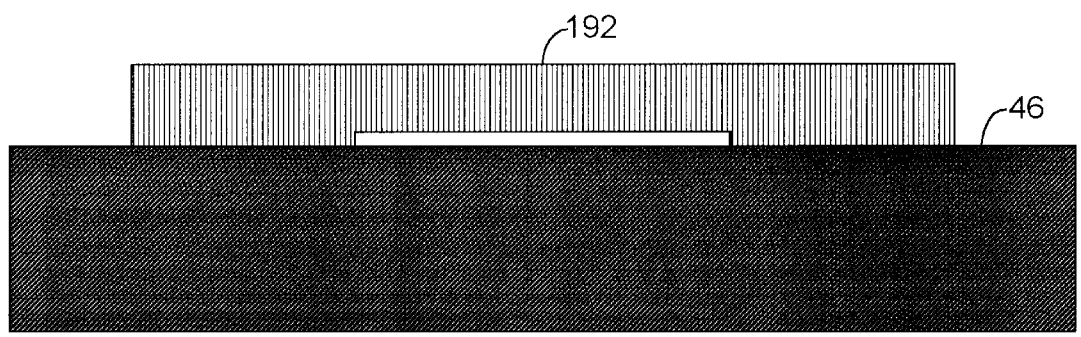
Figure 6:
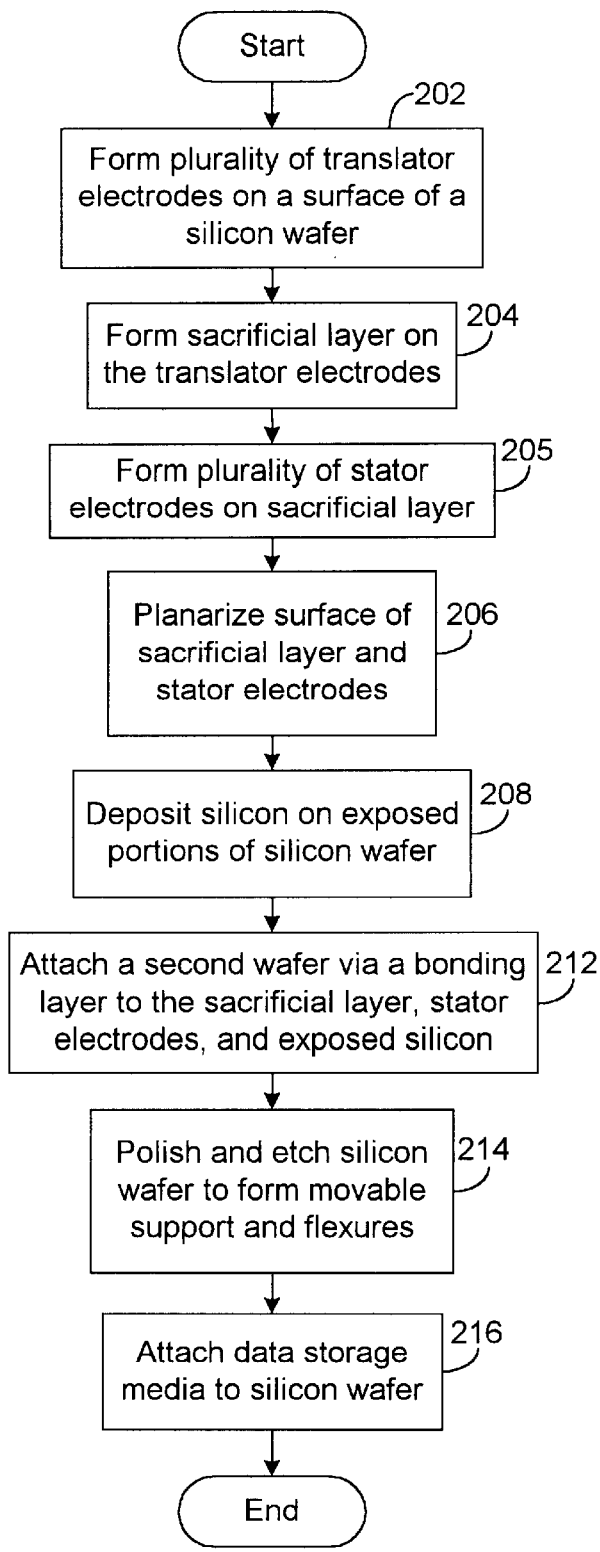
FIG. 6 is a flow chart illustrating the microfabrication process described by the present invention.

Once translator electrodes 88a and 88b are formed on the silicon layer 46, a sacrificial layer 192 is formed on the translator electrodes 88a and 88b and on the silicon layer 46, as shown by FIG. 5B and block 204 of FIG. 6. The sacrificial layer 192 can be formed by any suitable microfabrication technique or techniques. For example, in the preferred embodiment, the sacrificial layer 192 is deposited across the surfaces of the translator electrodes 88a and 88b and across the silicon layer 46. Then, the sacrificial layer 192 is preferably etched to expose portions of the silicon layer 46 which will not constitute a part of the movable support 73 when the movable support 73 is later formed, as described in further detail below. In the preferred embodiment, the thickness of the sacrificial layer 192 is about 1 to 2 microns.

After depositing the sacrificial layer 192, the stator electrodes 86a and 86b are formed on the sacrificial layer 192, as depicted by block 205 in FIG. 6. Preferably, the surface of the stator electrodes 86a and 86b opposite of the sacrificial layer 192 includes insulating material. This insulating material can be formed on the surface of the stator electrodes 86a and 86b prior to attaching the stator electrodes 86a and 86b to the sacrificial layer 192, or an insulating layer (not shown) can be deposited on the stator electrodes 86a and 86b once the stator electrodes 86a and 86b are formed on the sacrificial layer 192.

Figure 5C:
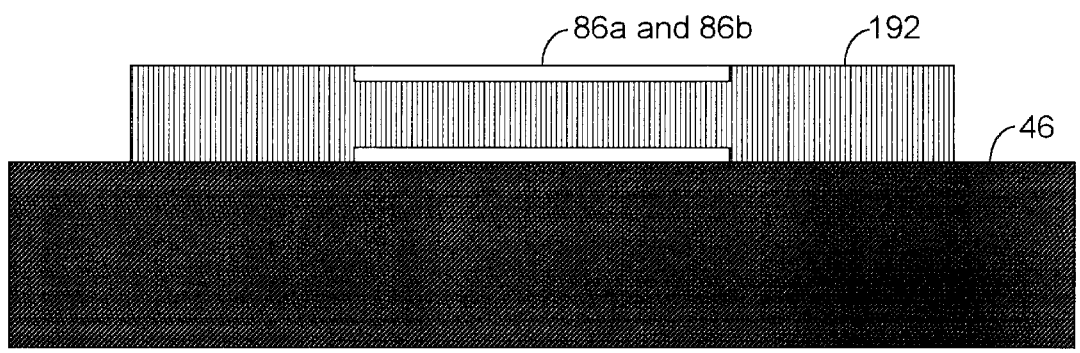

Once the stator electrodes 86a and 86b are fully formed on the sacrificial layer 192, the surface of the sacrificial layer 192 and stator electrodes 86a and 86b (including the insulating material formed on the stator electrodes 86a and 86b) is preferably planarized, as shown by FIG. 5C and block 206 of FIG. 6. In this regard, the surface can be planarized by further depositing sacrificial material on the surfaces of the stator electrodes 86a and 86b and the sacrificial layer 192 and then polishing the sacrificial material until the exposed surfaces of the translator electrodes 86a and 86b (including the insulating material formed on the surface of the stator electrodes 86a and 86b) and the sacrificial layer 192 are coplanar.

As depicted by FIG. 5D and block 208 of FIG. 6, silicon material is preferably deposited, or otherwise formed, on the exposed portion of the silicon layer 46. This deposited silicon forms part of the silicon layer 46, as depicted by FIG. 5D. The deposited silicon material is preferably polished such that the surface of the silicon layer 46, sacrificial layer 192, and stator electrodes 86a and 86b (including insulating material formed on the surface of the stator electrodes 86a and 86b) are coplanar.

Next, wafer 32 is attached to the silicon layer 46, sacrificial layer 192 and stator electrodes 86a and 86b (including insulating material formed on the surface of the stator electrodes 86a and 86b), as depicted by block 212 of FIG. 6. It is preferable to attach the wafer 32 via a bonding layer 98. In this regard, a bonding layer 98, preferably comprised of palladium, is formed on the silicon layer 46, sacrificial layer 192 and stator electrodes 86a and 86b (including insulating material formed on the surface of the stator electrodes 86a and 86b), as depicted by FIG. 5E. This bonding layer 98 can be attached to the silicon layer 46, sacrificial layer 192 and stator electrodes 86a and 86b (including insulating material formed on the surface of the stator electrodes 86a and 86b) via an adhesion layer (not shown) comprising, for example, chromium. Then, the wafer 32 can be bonded to the layer 98, as shown by FIG. 5E.

Preferably, the surface of the wafer 32 bonded to layer 98 includes silicon, and the surface of the layer 98 bonded to wafer 32 includes palladium. Therefore, the wafer 32 can be bonded to the layer 98 through the same bonding process described below for bonding contacts 42 to wafer 32. For simplicity, layer 98 constitutes a portion of wafer 32, so that only wafer 32 is shown in the drawings except for FIG. 5E.

It is desirable for the silicon layer 46 to have a thickness of about 60 microns in order for the movable support 73, which will described in further detail below, to resist bending and other deformations induced during normal operation of the storage component 45. Therefore, once the wafer 32 is attached, the silicon layer 46 is preferably polished on a surface opposite of translator electrodes 88a and 88b to a thickness of about 60 microns, as depicted by block 214 of FIG. 6.

Figure 5F:
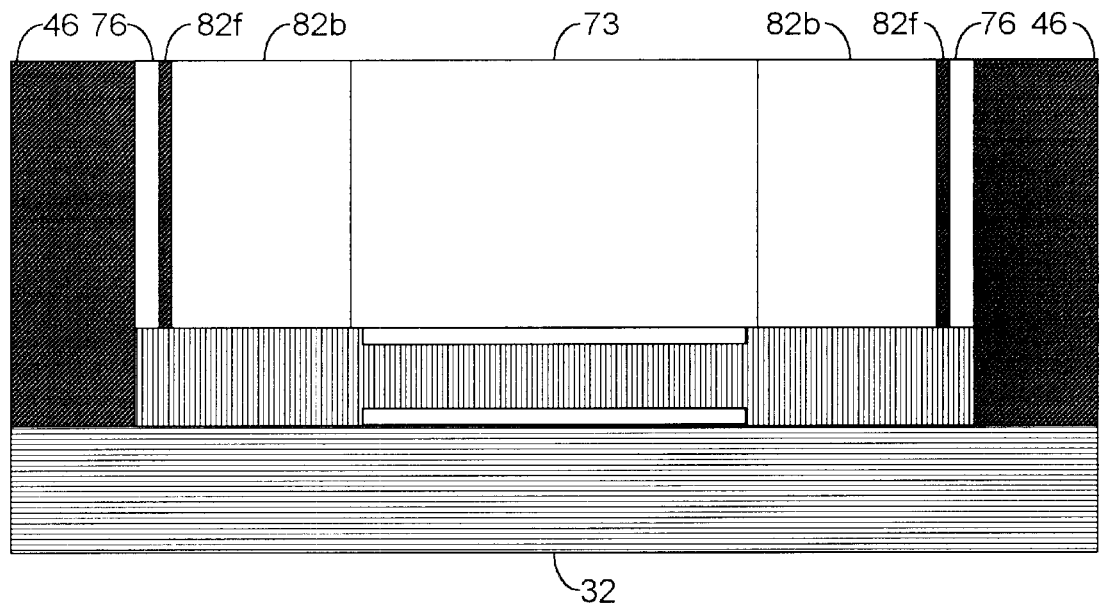

The silicon layer 46 is then preferably etched using known deep etch processing to form the movable support 73 and the flexures 82, as depicted by FIGS. 2A, 2D, 2E, and 5F and by block 214 of FIG. 6. Therefore, the movable support 73 and the flexures 82 are preferably comprised of silicon since the movable support 73 and the flexures 82 are etched from the silicon layer 46. As depicted by FIGS. 2A and 5F, the etching of the silicon layer 46 preferably forms a separation gap 76 between the storage component 45 and the silicon layer 46, except where the flexures 82 are connected to the silicon layer 46. This separation gap 76 allows the movable support 73 and the flexures 82 to move without engaging the silicon layer 46.

Figure 5G:
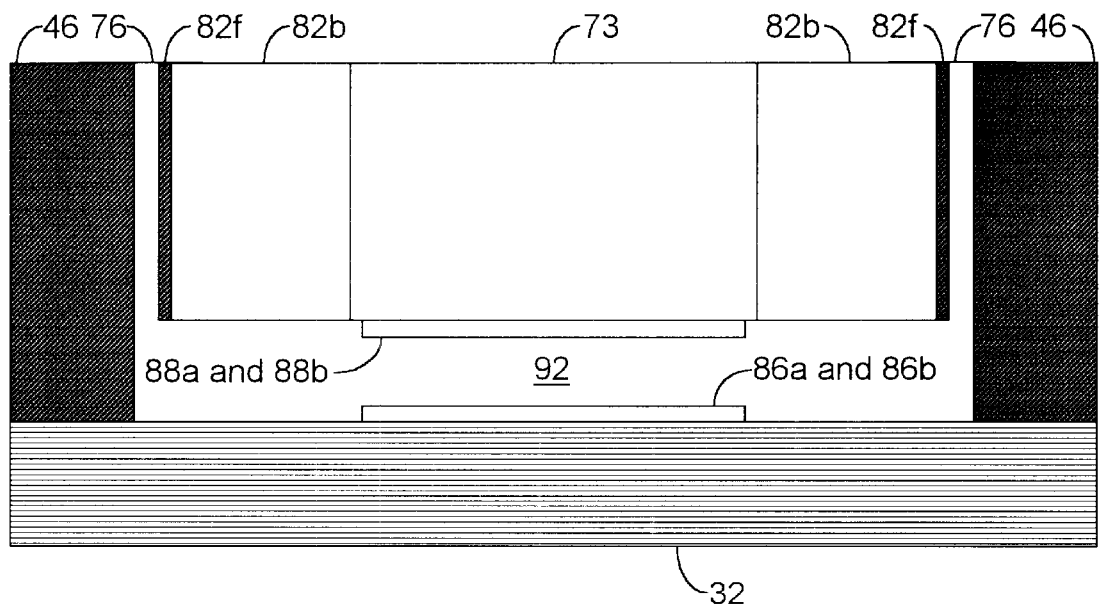

Once the silicon layer 46 is etched to form the movable support 73 and the flexures 82, portions of the sacrificial layer 192 are exposed by the separation gap 76. Therefore, the sacrificial layer 192 can be removed in order to create a separation gap 92 between the stator electrodes 86a and 86b and the translator electrodes 88a and 88b, as depicted by FIG. 5G. In this regard, a solution capable of dissolving the material of the sacrificial layer 192 can be inserted into the separation gap 76. After dissolving the sacrificial layer 192, the solution can be allowed to egress through the separation gap 76, thereby removing the sacrificial layer 192 and forming the separation gap 92. As shown by block 216 of FIG. 6, the data medium 71 can then be attached to the movable support 73 via any suitable microfabrication technique in order to form the device depicted by FIG. 2F.

Figure 7A:
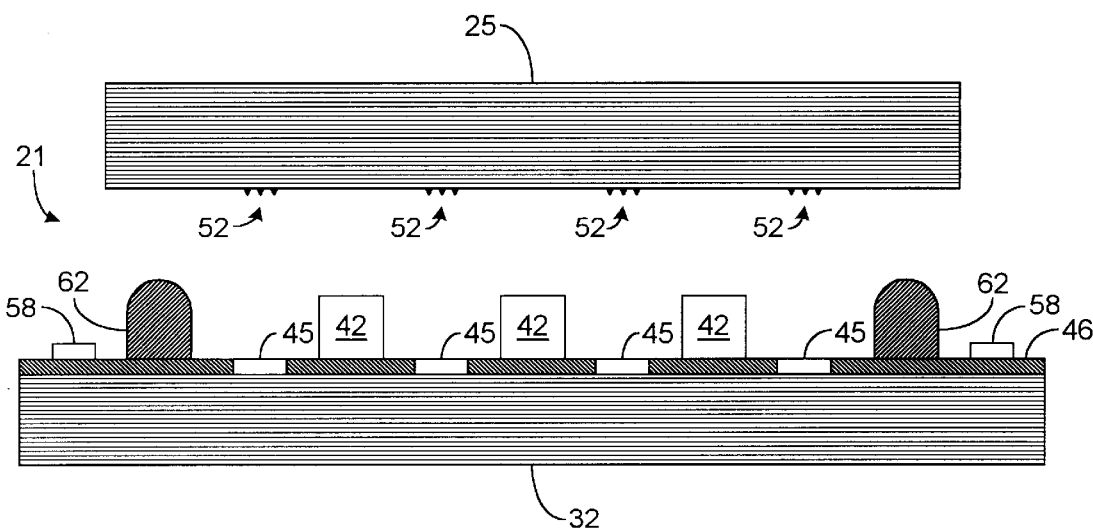
FIG. 7A is a cross sectional view of the data storage system during the manufacturing process of the preferred embodiment of the present invention before the two wafers of the data storage system are engaged.
Figure 7B:
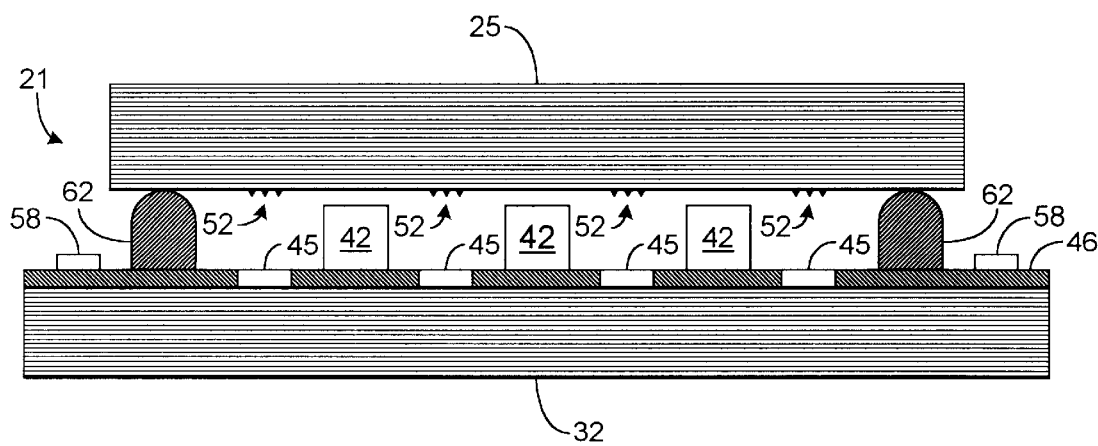
FIG. 7B is a cross sectional view of the data storage system when the two wafers are initially engaged during the manufacturing process of the preferred embodiment of the present invention.

Once the data storage components 45 are formed, as described above, the palladium contacts 42 and gasket 62 can be formed on the silicon layer 46 through any suitable microfabrication technique or techniques, as depicted by FIG. 7A. It should be noted that contacts 42 may be located on either side of the periphery defined by gasket 62, although having the contacts 42 located within the periphery as depicted by FIG. 1B is preferred.

A wafer 25 having tips 52 is then provided, as shown by FIG. 7A. Since it is desirable for the chamber 63 defined by the gasket 62 to be evacuated, the system 21 is placed in an annealing chamber which is then evacuated in order to create a vacuum around the entire system 21. Next, wafer 25 is engaged with the gasket 62. As can be seen by reference to FIG. 7B, the gasket 62 and contacts 42 are designed such that wafer 25 engages the gasket 62 prior to engaging any of the contacts 42. However, any configuration that allows a seal to form via gasket 62 when the system 21 is heated during the bonding process is sufficient for implementing the invention.

After engaging wafer 25 with the gasket 62, the wafers 25 and 32 are pressed against one another. The temperature of the annealing chamber is then increased to a bonding temperature, preferably below approximately 500 degrees Celsius so that any CMOS components or other types of components included within either wafer 25 or 32 are not damaged. When heated, the surfaces of gasket 62 and wafer 25 (i.e., germanium layer 65 in the preferred embodiment) engaged together form a eutectic. Once the palladium contacts 42 are engaged with the silicon portion of wafer 25, the palladium and silicon begins to bond. By maintaining the bonding temperature for the prescribed time, as will be discussed further below, a palladium-silicon bond forms between the silicon surface of wafer 25 and palladium contacts 45. Also, the eutectic formed between the gasket 62 and wafer 25 melts.

After maintaining the bonding temperature for the prescribed time, as will be discussed further below, the system 21 is cooled in order to complete the bonding process of the palladium-silicon bond. During this cooling process, the melted eutectic hardens or solidifies to form a seal between the gasket 62 and the wafer 25. Since the annealing chamber is evacuated, the formation of the seal creates a sealed vacuum in chamber 63. Therefore, once the manufacturing process is complete, the system 21 can be removed from the annealing chamber while preserving a vacuum sealed within chamber 63.

During the bonding process of the preferred embodiment, the temperature of the system 21 is initially increased to approximately 200 degrees Celsius within about 30 seconds. Although not necessary, it is preferable to change the temperature linearly (i.e., "ramp" the temperature) when the temperature of the system 21 is being varied during the bonding process.

The temperature of the system 21 is preferably held at approximately 200 degrees Celsius for about 30 seconds and then increased to the bonding temperature in about 15 seconds. Experiments have shown that bonding temperatures and durations sufficient for implementing the invention are approximately 450 degrees Celsius for about 30 minutes, approximately 400 degrees Celsius for about 30 minutes, or approximately 300 degrees Celsius for about 45 minutes. It should be noted that other bonding temperatures and durations are possible for bonding palladium contacts 42 to wafer 25 and for fusing gold gasket 62 to wafer 25.

After maintaining the bonding temperature for its associated duration, the temperature of the system 21 is decreased below approximately 100 degrees Celsius in about six minutes. At this point, a bond between the contacts 42 and wafer 25 should be sufficient enough to keep wafer 25 attached and aligned within precise tolerances to wafer 32 during normal operation. Furthermore, the seal of the gasket 62 should be formed, thereby capturing a vacuum within chamber 63.

It should be noted that the material of the contacts 42, wafer 25, and gasket 62 are not necessarily pure palladium, pure silicon and pure gold, respectively. Although the preferred embodiment utilizes pure elements of palladium, silicon, and gold, one ordinarily skilled in the art should realize that other elements can be added or combined with the silicon of wafer 25, the palladium contacts 42 and/or the gold gasket 62. However, the melting temperature of the sealing material should be close to the bonding temperature in order to achieve the benefit of forming a seal and a bond during the same heating process.

Furthermore, it should be noted that utilizing the materials and the heating process described by the preferred embodiment enables the wafers 25 and 32 to be bonded and sealed with temperatures below approximately 450 degrees Celsius. Therefore, utilizing the materials and the heating process of the preferred embodiment enables the system 21 to be formed without damaging any CMOS components or other types of temperature sensitive components included in the wafers 25 and 32. Consequently, additional steps to preserve CMOS components or other types of temperature sensitive components are not necessary. However, one skilled in the art should realize that other materials may be used, but the temperatures necessary to sufficiently bond the wafers 25 and 32 and/or to form the seal with gasket 62 may be affected.

It should be further noted that the gasket 62 does not necessarily have to be formed on wafer 32 and engage wafer 25. For example, the gasket 62 may be formed on wafer 25 and engage the wafer 32. Any configuration of the gasket 62 is sufficient as long as a seal between wafer 25 and 32 is formed during the heating process. In addition, one skilled in the art should also realize that multiple other wafers can be bonded during the bonding process in a variety of configurations.

Storage Components

Once the wafers 25 and 32 are bonded and sealed, the system 21 can operate as a storage device according to the preferred embodiment of the present invention. In this regard, when it is desirable to write or read data to or from one of the storage components 45, the medium 71 of the storage component 45 is independently moved to a desired position with respect to a particular tip 52 that corresponds with the storage component 45. The tip 52 may write or read data to or from a particular location on the medium 71 through any suitable known technique. In order for the tip 52 to write or read data to or from a different location on the medium 71, the medium 71 is moved to a different position with respect to the tip 52. The movement of the medium 71 is preferably co-planar and parallel to a plane defined by the surface of wafer 25 that is adjacent to wafer 32 (i.e., the xz-plane). Therefore, the distance of the closest point of the medium 71 to the tip 52 should remain approximately constant, although small perturbations in the movement of the medium 71 are possible which might cause small variations in the planarity of movement and the distance of the medium's 71 closest point to tip 52. These perturbations are acceptable as long as medium 71 does not engage tip 52, thereby damaging one of the tip 52 or the medium 71, and as long as they do not unacceptably degrade the signal-to-noise ratio of the read-write process.

The configuration of the flexures 82 allows the medium 71 to move with little relative resistance in directions parallel to the plane defined by the surface of wafer 25 that is adjacent to wafer 32 (i.e., the xz-plane) and with large relative resistance in directions out of this plane (i.e., in the y-direction). In this regard, the panels of the flexures 82 have a high aspect ratio which causes the flexures to resist motion out of the plane defined by the surface of wafer 32 that is adjacent to wafer 25 more than motion parallel to this plane. The aspect ratio is defined herein as height divided by width. The width is the shortest length of the panel in a direction parallel with the plane defined by the surface of wafer 32 that is adjacent to wafer 25, and the height is length of the panel in a direction perpendicular with this plane. In the preferred embodiment, the height of the panels of the flexures 82 should be between approximately 40 to 100 micrometers, and the width of the panels of the flexures 82 should be between approximately 1 to 2 micrometers, such that the aspect ratio is approximately 40. By resisting motion of the medium 71 in the y-direction, the high aspect ratio of the flexures 82 helps to maintain adequate separation between the medium 71 and tips 52 and between the stator electrodes 86a and 86b and the translator electrodes 88a and 88b.

As the medium 71 moves, the flexures 82 are put in tension and compression similar to springs. In this regard, an equilibrium position for medium 71 exists where the panels of the flexures 82 are neither in tension nor compression. As the medium 71 is moved toward or away from a flexure 82, the center panel 82b (FIG. 2D) of the flexure 82, which is coupled to the medium 71, pulls or pushes the flexure 82 in the direction of motion of the medium 71. As a result, the other panels 82a and 82b, which are coupled to the stationary silicon layer 46, are deformed from equilibrium. The deformation of the panels 82a and 82c resists the movement of the medium 71. Therefore, once the force inducing movement of the medium 71 is removed, the elasticity of the flexures 82 causes the flexures 82 to return to the equilibrium position where the flexures 82 are not deformed.

In order to move the medium 71, a periodic or a spatially alternating voltage pattern is placed on the translator electrodes 88a and 88b and repeating spatially alternating voltage pattern is placed on the stator electrodes 86a and 86b. Then, the voltage pattern on the stator electrodes 86a or 86b is stepped in one direction across the stator electrodes 86a or 86b. By stepping the alternating voltage patterns of the stator electrodes 86a and 86b, the translator electrodes 88a and 88b (and, hence, the movable support 73 and the medium 71) are pulled in a direction opposite to the stepped direction.

As can be seen with reference to FIGS. 2B and 2C, stepping the voltage patterns of the stator electrodes 86a as described above moves the medium 71 in a first direction, and stepping the electrical fields of the stator electrodes 86b moves the medium 71 in a second direction perpendicular to the first direction. Therefore, by controlling the voltage patterns applied to stator electrodes 86a and 86b, a two-dimensional range of motion can be achieved for medium 71. Consequently, any point on the medium's 71 surface is accessible to the tips 52.

When it is desirable for a particular tip 52 to write or read data to or from a particular point on medium 71, the particular point of medium 71 is moved to a predefined position with respect to the tips 52 so that the particular tip 52, which is preferably stationary, may access the particular point. This movement to the particular position is achieved by appropriately manipulating the voltage pattern on the stator electrodes 86a and 86b, as described above. Once the medium 71 has been moved to the appropriate position, the tips 52 may write and/or read data to and/or from the medium 71 according to any suitable technique.

In concluding the detailed description, it should be noted that it will be obvious to those skilled in the art that many other variations and modifications may be made to the preferred embodiment. All such variations and modifications are intended to be included herein within the scope of the present invention, as set forth in the following claims.

Now, therefore, the following is claimed:

1. A microfabricated data storage device comprising:
   a plurality of data storage media integrated within said microfabricated data storage system, each of said plurality of data storage media coupled to a separate movable support;
   a plurality of writing tips, each of said plurality of writing tips configured to write data to a respective one of said plurality of data storage media;
   a first plurality of electrodes coupled to said movable support;
   a plurality of flexures connecting a first layer of material of said device to said movable support, each of said plurality of flexures configured to resist motion of said movable support in a first predetermined direction more than motion of said movable support in a second predetermined direction; and a second plurality of electrodes coupled to a second layer of material of said microfabricated data storage device, at least one of said second plurality of electrodes configured to generate an electrical field that attracts an electrical field generated by one of said first plurality of electrodes in order to move said movable support in said second predetermined direction.

2. The device of claim 1, wherein said first plurality of electrodes extends in a third direction and said second plurality of electrodes extends in a fourth direction that is substantially parallel with said third direction.

3. The device of claim 1, wherein a surface of said each of said plurality of media that is coupled to said respective movable support has a surface area of less than approximately 25 square millimeters.

4. The device of claim 1, wherein said electrodes, said flexures, and said movable support define a surface actuator.

5. The device of claim 1, wherein each of said plurality of data storage media is separated from a respective one of said writing tips by a distance between approximately 300 to 2000 Angstroms.

6. The device of claim 1, wherein said first plurality of electrodes and said second plurality of electrodes are separated by a gap, wherein a distance between said first plurality of electrodes and said second plurality of electrodes remains substantially constant as said first plurality of electrodes moves with respect to said second plurality of electrodes.

7. The device of claim 6, wherein said first plurality of electrodes extends in a third direction and said second plurality of electrodes extends in a fourth direction that is substantially parallel with said third direction.

8. The device of claim 7, wherein said second plurality of electrodes are configured to face said first plurality of electrodes.

9. The device of claim 1, wherein said electric field generated by said first plurality of electrodes has a repeat distance, said first plurality of electrodes and said second plurality of electrodes are separated by a distance and said repeat distance divided by said distance is less than approximately 16.

10. The device of claim 1, wherein said each of said plurality of data storage media is coupled respectively to a first surface of said movable support and said first plurality of electrodes is coupled to a second surface of said movable support opposite of said first surface.

11. The device of claim 10, wherein a surface of said layer coupled to said second plurality of electrodes is substantially parallel to said second surface of said movable support.

12. The device of claim 10, wherein a repeating spatially alternating voltage pattern is applied to said second plurality of electrodes.

13. The device of claim 1, wherein said each of said plurality of flexures comprises:

a first panel coupled to said movable support; and a second panel coupled to said layer and interconnected with said first panel.

14. The device of claim 13, further comprising a third panel coupled to said layer on a side of said first panel that is opposite of said second panel, wherein said third panel is interconnected with said first and second panels and said second panel is substantially parallel with said third panel.

15. The device of claim 1, further comprising:

a gasket fused to said microfabricated data storage device, said gasket configured to seal said plurality of data storage media.

16. The device of claim 15, wherein said microfabricated data storage device includes silicon bonded to palladium.

17. An electrostatically actuated data storage system, comprising:

a micromachined structure;

a movable support;

a medium for storing information, said medium coupled to a first surface of said movable support;

a writing tip configured to write data to said medium;

at least one flexure connecting said movable support to said micromachined structure;

a first electrode coupled to a second surface of said movable support, wherein said second surface of said movable support is opposite of said first surface of said movable support; and a plurality of electrodes coupled to said micromachined structure, said plurality of electrodes configured to generate an electrical field that attracts an electrical field generated by said first electrode in order to move said medium relative to said micromachined structure.

18. The system of claim 17, wherein said writing tip is separated from said medium.

19. The system of claim 17, wherein said second surface of said movable support is substantially parallel with a surface of said micromachined structure coupled to said plurality of electrodes.

20. The system of claim 17, wherein a surface of said first electrode faces surfaces of said plurality of electrodes and said surface of said first electrode is substantially parallel with said surfaces of said plurality of electrodes.

21. The system of claim 17, wherein a surface of said medium that is coupled to said movable support has a surface area of less than approximately 25 square millimeters.

22. The system of claim 17, wherein said system includes a plurality of said medium integrated with said system.

23. The system of claim 17, wherein a repeating spatially alternating voltage pattern is applied to said plurality of electrodes.

24. The system of claim 17, wherein said flexures, said electrodes, and said movable support define a surface actuator.

25. The system of claim 17, wherein said first electrode and said plurality of electrodes are separated by a gap, wherein a distance between said first electrode and said plurality of electrodes remains substantially constant as said medium moves relative to said micromachined structure.

26. The system of claim 17, wherein a repeat distance divided by a distance between said first electrode and said plurality of electrodes is less than approximately 16.

27. The system of claim 17, wherein said flexure further comprises:

a first panel coupled to said movable support; and a second panel coupled to said micromachined structure and interconnected with said first panel.

28. The system of claim 17, wherein said medium is separated from said writing tip by a distance between approximately 300 to 2000 Angstroms.

29. The system of claim 17, further comprising a bond formed between said micromachined structure, said bond formed including palladium bonded with silicon.

30. A method, comprising:

providing a data storage medium coupled to a first surface of a movable support;

providing a writing tip for writing data to said data storage medium;

providing a flexure connecting said movable support to a microfabricated structure;

providing a first plurality of electrodes coupled to a second surface of said movable support that is opposite of said first surface;

providing a second plurality of electrodes coupled to said microfabricated structure; and varying a voltage pattern applied to one of said electrodes in order to move said data storage medium relative to said writing tip.

31. The method of claim 30, further comprising forming said first plurality of electrodes substantially parallel with said second plurality of electrodes.

32. The method of claim 30, further comprising maintaining a fixed distance between said first plurality of electrodes and said second plurality of electrodes.

33. The method of claim 30, further comprising:

bonding palladium elements to silicon elements in order to form a bond between said microfabricated structure and another microfabricated structure coupled to said writing tip;

fusing a gasket to one of said microfabricated structures during said bonding step; and sealing said data storage medium within said microfabricated structures during said fusing step.

34. The method of claim 30, further comprising integrating a plurality of said data storage media within said microfabricated structure.

35. The method of claim 30, further comprising maintaining a distance separating said data storage medium from said writing tip between approximately 300 to 2000 Angstroms.

36. A method for microfabricating a data storage system, comprising steps of:

forming a first plurality of electrodes on a surface of a first wafer;

forming a sacrificial layer on said first plurality of electrodes;

forming a second plurality of electrodes on said sacrificial layer;

attaching a second wafer to said sacrificial layer;

forming a data storage medium on said first wafer;

removing portions of said first wafer to form flexures that allow said data storage medium to move in a predetermined direction; and removing at least a portion of said sacrificial layer.

37. The method of claim 36, further comprising forming a plurality of said data storage medium on said first wafer during said forming a data storage medium step.

38. The method of claim 36, further comprising etching said first wafer in order to form said flexures.

39. The method of claim 36, further comprising:

providing a writing tip for writing data to said data storage medium; and maintaining a distance separating said data storage medium from said writing tip between approximately 300 to 2000 Angstroms.

40. The method of claim 36, wherein said first wafer comprises silicon.

41. The method of claim 40, further comprising:

forming a contact comprised of palladium on said first wafer;

providing a third wafer having a writing tip disposed on a surface of said third wafer; and bonding said contact to a portion of said third wafer, said portion comprising silicon.

* * * * *